(12) United States Patent
Yang et al.

(10) Patent No.: US 10,114,689 B1
(45) Date of Patent: Oct. 30, 2018

(54) DYNAMIC PLAYLIST GENERATION

(71) Applicant: Amazon Technologies, Inc., Seattle, WA (US)

(72) Inventors: Michael Yang, San Francisco, CA (US); Samuel Lyman Owen, San Mateo, CA (US); Jimmy Du, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 105 days.

(21) Appl. No.: 14/981,860

(22) Filed: Dec. 28, 2015

(51) Int. Cl.
*G06F 11/00* (2006.01)
*G06F 11/07* (2006.01)
*G06F 17/30* (2006.01)
*H04L 29/06* (2006.01)

(52) U.S. Cl.
CPC ...... *G06F 11/0793* (2013.01); *G06F 11/0709* (2013.01); *G06F 11/0751* (2013.01); *G06F 17/30053* (2013.01); *G06F 17/30887* (2013.01); *H04L 65/4084* (2013.01); *H04L 65/80* (2013.01)

(58) Field of Classification Search
CPC ............. G06F 11/0793; G06F 11/0709; G06F 11/0751
See application file for complete search history.

(56) References Cited

U.S. PATENT DOCUMENTS

| | | | |
|---|---|---|---|
| 5,996,015 A * | 11/1999 | Day | H04L 29/06 348/E7.071 |
| 2005/0278761 A1 | 12/2005 | Gonder et al. | |
| 2006/0005224 A1 | 1/2006 | Dunning et al. | |
| 2008/0022012 A1 | 1/2008 | Wang | |
| 2008/0235746 A1 | 9/2008 | Peters et al. | |
| 2010/0077441 A1 | 3/2010 | Thomas et al. | |
| 2011/0072105 A1* | 3/2011 | Biderman | H04N 7/17318 709/217 |
| 2016/0337426 A1* | 11/2016 | Shribman | H04L 65/4084 |

\* cited by examiner

*Primary Examiner* — Bryce P Bonzo
*Assistant Examiner* — Katherine Lin
(74) *Attorney, Agent, or Firm* — Davis Wright Tremaine LLP

(57) ABSTRACT

A trigger involving a first media stream is detected, wherein the first media stream corresponds to a first playlist comprising a first sequence of references, the first sequence of references corresponds to respective segments of the first media stream, and the first playlist has an identifier usable to obtain a copy of the first playlist. In response to detection of the trigger, a second playlist that comprises a second sequence of references is determined, wherein the second sequence of references switches from a first reference corresponding to a segment of the first media stream to a second reference corresponding to a segment of the second media stream, the identifier is re-associated to the second playlist.

21 Claims, 15 Drawing Sheets

| Services | Edit | | Actions | |
|---|---|---|---|---|
| TRANSCODING SERVICES: 803<br>- Transcoding<br>- Jobs<br>- Piplines | Create Live Event | | | |

| Filter: View All | | 812 | Search Live Events 🔍 806 | 814 |
|---|---|---|---|---|
| ☐ Name 816 | | Status 818 | | Description 820 |
| ☐ Rabbits | | Live 00:23:02 | | Event for watching rabbits |
| ☐ SCUBA | | Inactive | | Event for learning to dive |
| ☐ Sorority Life | | Ready: Receiving Signal | | Live event for Sorority Rush |
| ☐ A.I. | | Ready: Waiting for Signal | | Event for meeting HAL |
| ☐ BASE Jumping | | Archived: Not Listening for Signal | | Event for watching BASE |

FIG. 8

DYNAMIC PLAYLIST GENERATION

CROSS REFERENCE TO RELATED APPLICATION

This application incorporates by reference for all purposes the full disclosure of co-pending U.S. patent application Ser. No. 14/981,856, filed concurrently herewith, entitled "AUTOMATIC FAILOVER FOR LIVE VIDEO STREAMING".

BACKGROUND

Live streaming of events is a rapidly growing market. Live streaming allows producers to reach a broader audience, allows for deeper engagement, and provides instant, real-time feedback of the event. Live streaming also opens opportunities for additional revenue streams. However, traditionally, customers, such as owners/operators of a live event, have had to create their own solution, including complex processes, which increase the potential for errors, or have had to use other services such as YouTube®, which may cause the customer to lose control over the branding, monetization, and playback experience.

Streaming media technologies have improved significantly since the 1990s, when delivery was typically uneven. However, the quality of streamed content is still dependent upon the user's connection speed and streaming over the user's connection may fail for many reasons. For example, failure could occur due to camera hardware failure, issues with computer software being run with the customer's camera and/or encoder could fail, server failure, network connection failure, and the like. Typical solutions to the problems associated with live event streaming involve multi-step or manual operations; for example, in the event of a failure, customer may need to manually change the web page/player configuration to point to a Uniform Resource Locator for the backup playlist.

BRIEF DESCRIPTION OF THE DRAWINGS

Various techniques will be described with reference to the drawings, in which:

FIG. 8 is an illustrative example of a user interface console for showing live transcoding events in accordance with at least one embodiment;

DETAILED DESCRIPTION

Figure 1:
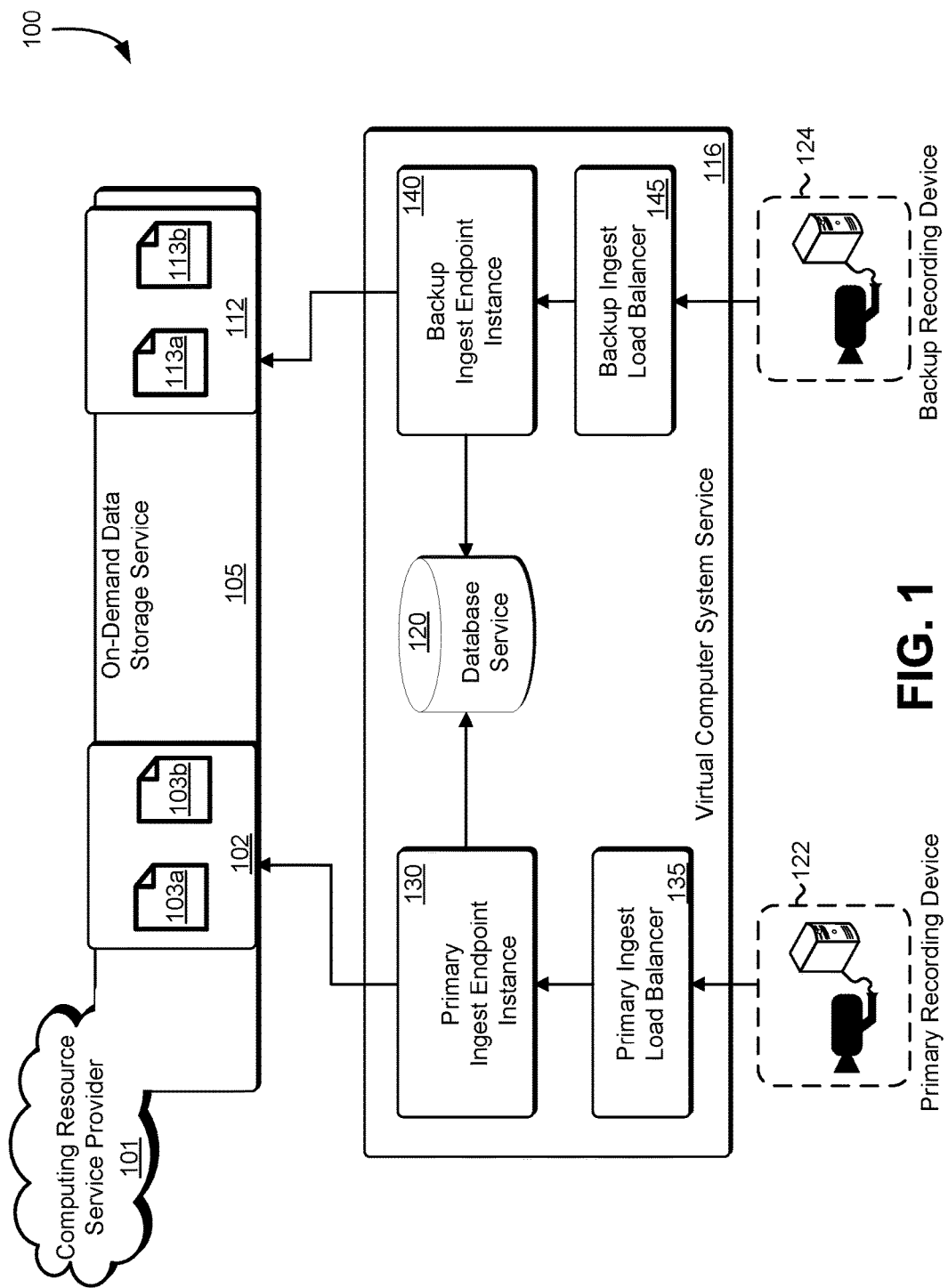
FIG. 1 is an environment illustrating a live multimedia content service for receiving multimedia input in accordance with at least one embodiment.

This disclosure relates to delivering on-demand and live multimedia content to an application, such as a multimedia player running on a client device, using automatic failover between multiple multimedia input streams. A live multimedia content service may be a web service configured to simplify the process of publishing and streaming live video content between the owner of the content and the viewer of the content. The live content service may include additional services for transcoding, streaming, encoding profiles and formats, handling failovers, scaling, publishing, and providing playback Uniform Resource Identifiers (URIs) to viewers of the live event.

A "live event" in the context of the present disclosure may be a multimedia presentation accessible by a client device, such as a device of a viewer of the live event, using a unique identifier for a playlist file, referred to herein as a "playlist." A playlist may include an ordered list of media URIs and informational tags including location information for each multimedia segment file of a live streaming event. The URIs and their associated tags may specify the multimedia segment file (MMSF) locations in an on-demand data storage service.

During a failover event (also referred to as a failover condition), a live multimedia content service may be configured to generate the playlist for the live event, such that, in between reloading of the playlist URI (e.g., by selecting "play" on a viewer's device), the multimedia input feed may be switched from a primary input to a secondary (or backup) input, and may continue to use the same delivery playlist URI. The multimedia input feed, also referred to as a camera feed or camera input feed, may include a flow of audio/video data from a media source (e.g., a video camera, an audio interface, screen capture software, etc.) via an encoder used to digitize the content. An audio stream and a video stream may be compressed using audio/video codecs and the encoded audio/video streams may be assembled in a container bitstream, which may be transmitted to a live event streaming service.

In one example, when distributing a live event video stream to viewers of the event, a customer (in this example, the owner or operator of the live event), embeds a video player into the customer's webpage using a URI provided by the live multimedia content service. The URI may be a delivery playlist URI that is the only URI the viewer will need for accessing the live event; even when the playlist is updated or changed, the delivery playlist URI will remain the same. The URI provided by the live multimedia content service to the customer may route viewers through a content delivery network (CDN) to a delivery service of the live multimedia content service. The delivery service may generate the playlist dynamically, on demand, to a viewer device based on the time the viewer request is received. The delivery playlist URI is accessed by a viewer device, or is provided to a viewer device by, in this example, the content owner or operator of the live event, and provides the viewer's player with the locations of the MMSFs to stream the live event. The playlist is updated by removing MMSF URIs from the playlist and adding one or more new MMSF URIs for the next section of the live event.

An on-demand data storage service (referred to herein as a data storage service) may be used to store and maintain MMSFs transmitted from all multimedia input sources, such as Internet protocol (IP) cameras, software encoders, and other multimedia hardware for recording. The playlist containing URIs of the MMSFs is transmitted over a CDN, which is used for delivering and caching of the MMSFs stored in the data storage service and for caching playlist URI results. In the examples described herein, a playlist is dynamically generated to create a timeline for a live streaming event and to determine/provide a location of the MMSFs that, when transmitted/played in order, creates the live streaming event. The playlist file maintains and provides an ordered list of URIs of the MMSFs, where each MMSF has one associated URI that provides the remote resource location of the file. The dynamically-generated playlist is associated with a single URI, referred to as a "delivery playlist URI," which is accessed by a player running on a viewer's device in order to receive the live streaming event.

In some example embodiments, each playlist contains a set number of MMSF URIs, where each MMSF URI provides the location of the MMSF in a data storage service. The MMSFs may each be of different or equal lengths. In some examples, MMSFs will be between 2-10 seconds in duration. The live streaming event is created from a stream of MMSF URIs that are dynamically generated based on the locations of the MMSFs listed in the playlist, in consecutive order. The dynamically-generated playlist may include MMSF URIs from either or both of the primary and secondary input feeds. The playlist may be dynamically generated and/or dynamically updated with new multimedia file segments as MMSFs are uploaded to the on-demand data storage service.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 is an example embodiment of an environment 100 illustrating a live multimedia content service for receiving multimedia input in accordance with various embodiments. The environment 100 is an environment for receiving multimedia input (e.g., multimedia content such as audio/video data recording signals of a live streaming event) from two multimedia recording devices. The two multimedia recording devices, primary recording device 122 and backup recording device 124 may each be a video recorder, Internet protocol camera, software encoder, or the like. The multimedia recording devices may be configured to record a live event to be streamed via a live multimedia content service (described and illustrated in connection with FIG. 2). The multimedia input is streamed over the Internet to an end-user, such as a viewer of the live event, where "streaming," in the context of the present disclosure, may refer to a process of delivering multimedia content in a manner such that the content is received by and presented to a viewer device while content is being delivered to a viewer's computer system.

The primary recording device 122 transmits multimedia input to the virtual computer system service 116 via a first communication channel between the primary recording device 122 and the virtual computer system service 116. The multimedia input of the primary recording device 122 may be received via a load balancer, such as the primary load balancer 135 and forwarded to a first virtual computer system service instance, such as the primary ingest endpoint instance 130, referred to as a primary ingest endpoint.

The backup recording device 124 may also be configured to transmit multimedia input to the virtual computer system service 116 via a second communication channel. The multimedia input of the backup recording device 124 may be received via a separate load balancer, such as the backup load balancer 145 and forwarded to a second virtual computer system service instance, such as the backup ingest endpoint instance 140, referred to as a backup ingest endpoint.

The live multimedia input, such as audio/video data recorded of a live event, may be recorded and transmitted in raw file formats and/or rendered file formats. The customer's software encoder may convert the live multimedia input into a publishing stream that is transmitted to (or published to) an ingest endpoint of a virtual computer system service 116. The publishing stream may be converted from the source format of the publishing stream into a different file format for streaming the live content to a viewer (not shown). For example, the publishing stream may be converted into a plurality of MMSFs that may be stored as a transport stream. The transport stream format may be a video stream file format (e.g., Apple® HTTP Live Streaming (HLS) format, Microsoft® Smooth Streaming (MSS), Adobe® HTTP Dynamic Streaming (HDS), Dynamic Adaptive Streaming over HTTP (DASH), etc.) for storing video, audio, and data information, and may further specify a container format used to identify and interleave different data types.

A data storage service 105 may include a collection of computing resources provided by a computing resource service provider 101 that is configured to synchronously process requests to store and/or access data. The data storage service 105 may operate using computing resources (e.g., databases) that enable the data storage service 105 to locate and retrieve data and enable the data storage service 105 to provide the data in response to requests for the data. For example, the data storage service 105 may maintain stored data in a manner such that, when a request for a data object is retrieved, the data object can be provided (or streaming of the data object can be initiated) in a response to the request. As noted, data stored in the data storage service 105 may be organized into data objects, such as logical data containers. The logical data containers may have arbitrary sizes, except, in some implementations, for certain constraints on size. Thus, the data storage service 105 may store numerous logical data containers of varying sizes, such as a primary logical data container 102 and a backup logical data container 112, where both logical data containers 102 and 112 are maintained for the same live event owned by the customer.

The primary logical data container 102 may be configured by the customer as a first object of the data storage service 105, which may be used to store MMSFs 103a-b received from a primary publishing stream via the primary multimedia recording device 122. The backup logical data container 112 may be configured by the customer as a second object of the data storage service 105, which may be used to store MMSFs 113a-b received from a backup publishing stream via the backup multimedia recording device 124.

Each of the MMSFs may be stored, as a transport stream file, in a logical data container of the data storage service 105 for the specific live event. Each time a new MMSF is created, a database record, stored with a database service 120, may be created and/or updated to maintain metadata and information related to the MMSF. For example the database record may maintain location information of the MMSF stored with the data storage service 105, maintain a status or availability of transcoded MMSFs, persist live event metadata, maintain a media sequence number (MSN) associated with the MMSF (described in connection with FIG. 2), and contain other details regarding each MMSF created and/or uploaded to the data storage service 105. It must be noted that although the present disclosure refers to MSNs, which is used by HLS, it is contemplated that embodiments are not limited to HLS; rather, as used herein, MLS is contemplated to represent any of a variety of identifiers usable for identifying the media segment. It must be noted, that FIG. 1 is intended for illustrative purposes only, and not all components shown in FIG. 1 will be present in all embodiments. For example, in some embodiments the data storage service 105 is not present. In such embodiments, the output files may be stored on the transcoding host (e.g., ingest endpoint) in lieu of being stored at the data storage service 105.

The database service 120 may operate as a key value store that associates data objects with identifiers of the data objects that may be used by the customer or other services or entities, such as the virtual computer system service 116 or the primary ingest endpoint instance 130, to retrieve or perform other operations in connection with the MMSFs and/or other data stored by the database service 120. The virtual computer system service 116 may include one or more servers that may be allocated as on-demand or dedicated servers for one or more customers of the virtual computer system service 116. The virtual computer system service 116 can receive a request from a customer (not shown) to launch a virtual machine instance. The customer may specify one or more specific dedicated servers, request that the virtual computer system service 116 instantiate one or more servers and/or instances based on the customer's needs, or, upon receipt of multimedia data, the virtual computer system service 116 may instantiate a new virtual computer system service instance per each multimedia device detected.

Figure 2:
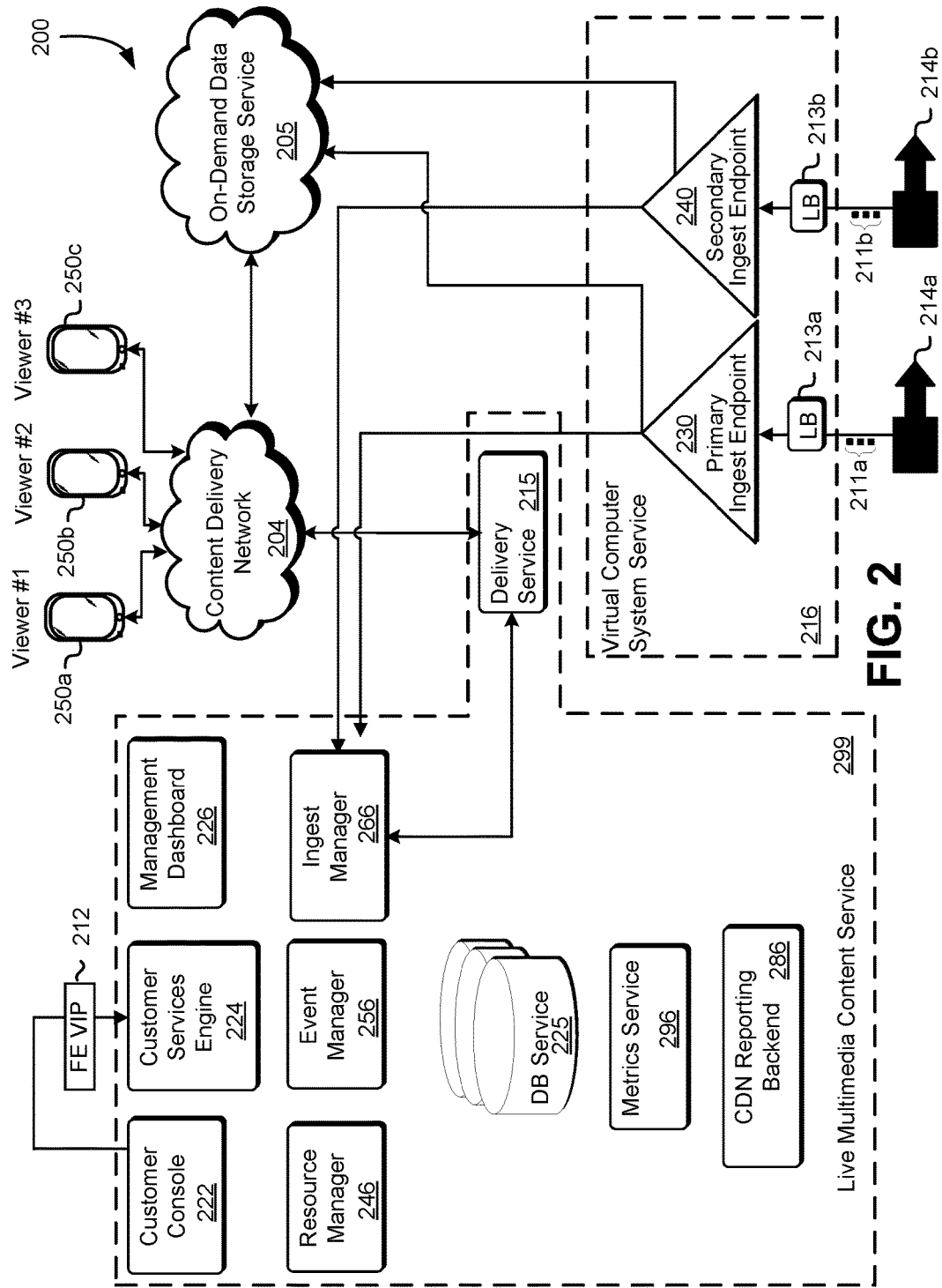
FIG. 2 is an environment illustrating a virtual computer system service for receiving multimedia content to be transcoded for delivery to viewers in which various embodiments can be implemented.

FIG. 2 is an illustrative example of an environment 200 including services associated with a virtual computer system service 216 for receiving multimedia content in accordance with at least one embodiment, such as the virtual computer system service 116 of FIG. 1. A customer, being an owner or operator of a live streaming event, controls or operates one or more multimedia recording devices, such as recording devices 214a and 214b. Recorded content from the recording devices 214a and 214b is published to a computer system, such as an ingest endpoint of the virtual computer system service 216. As illustrated in the environment 200, two recording devices are configured to publish or transmit their respective input streams to two instances or servers of the virtual computer system service 216.

The virtual computer system service 216 may include a collection of computing resources configured to instantiate virtual machine instances on behalf of the customer. The customer, via devices 214a and 214b, may interact with the virtual computer system service 216 (via appropriately configured and authenticated application programming interface (API) calls) to provision and operate virtual computer systems that are instantiated on physical computing devices hosted and operated by a computing resource service provider (not shown). The virtual computer systems may be used for various purposes, such as to operate as servers supporting a live event streaming application, supporting a website, to operate business applications or, generally, to serve as computing power for the customer. The virtual computer system service 216 may include a primary ingest endpoint 230, a backup ingest endpoint 240, a primary ingest load balancer 213a, and a secondary ingest load balancer 213b. Although FIG. 2 shows an embodiment that utilizes a virtual computer system service, any other computer system or computer system service may be utilized, such as a computer system or computer system service that does not employ virtualization or instantiation and instead provisions computing resources on dedicated or shared computers/servers and/or other physical devices.

A primary publishing stream 211a, such as a camera feed, is transmitted from the first recording device 214a to the primary ingest endpoint 230 via the load balancer 213a. A secondary publishing stream 211b is transmitted from the second recording device 214b to the secondary ingest endpoint 230 via the load balancer 213a. Note that while FIG. 2 illustrates an embodiment that utilizes load balancers, other example embodiments may be configured for the ingest endpoints to receive the respective input streams 211a and 211b directly from the recording devices or via other computer system components.

The live multimedia content service may further include an ingest endpoint, such as an instance or host of the virtual computer system service 216. The ingest endpoint may deploy additional servers, such as a web server to serve dynamic Hypertext Transfer Protocol (HTTP) content, libraries, programs, and/or codecs for handling multimedia data, audio/video containers, multiplexer (mux) and demultiplexer (demux) libraries, and other transcoding and encoding software. The ingest endpoints may receive multimedia input streams from the multimedia recording devices 214a and 214b recording the live event. The ingest endpoints may include or employ a web server configured to receive incoming multimedia input for streaming audio, video, and other data (e.g., Real-Time Messaging Protocol (RTMP), Real-Time Streaming Protocol (RTSP), and MPEG-Transport Stream (TS)).

The camera input feed may be transcoded using transcoding software, which may include a library, program, codec, and the like for handling multimedia data and for transcoding multimedia files (e.g., Ffmpeg) from a first multimedia content format (an input format) to a second multimedia content format (an output format). The second multimedia content format (referred to as multimedia segment files) may be a content delivery protocol, such as HLS, MSS, HDS, and DASH. Furthermore, the camera input feed may be transcoded based at least in part on the export file type definitions provided by an application, such as a multimedia player of a viewer's device (referred to as a multimedia player. For example, a camera input feed may be transcoded and streamed to a multimedia player based at least in part on video formats accepted by the multimedia player.

The camera input feed may be transcoded into MMSFs that are uploaded to a logical data container of a data storage service 205 that is associated, in this example, with the live event owner/operator. The ingest endpoint instance may further update a database, such as a database service database, to include information and/or metadata related to each MMSF. The information may be uploaded to the database during or after the ingest endpoint uploads the MMSFs to the logical data container. The database may be used to monitor progress and provide updates for the delivery endpoint software to identify when to deliver a next playlist.

Multimedia input streams may be received as input at one or more ingest endpoints. For example, a first multimedia device may transmit multimedia input to a primary ingest endpoint. The multimedia input stream may be received at the primary ingest endpoint via one or more load balancers. Each primary ingest endpoint may be interconnected with one or more load balancers. For each multimedia device transmitting multimedia input, an ingest endpoint will be associated specifically for that multimedia device; for example, if there are three multimedia devices recording the live event, there will be three ingest endpoints specifically assigned to receive only the multimedia input stream from one device.

A CDN 204 may include a large distributed system of proxy servers deployed in one or more data centers via the Internet. The CDN 204 may be used to provide and serve content, such as multimedia content, to end-users with a viewer device, such as one of viewer devices 250*a-c*. The CDN 204 may be used to provide multimedia live event streaming between customers and viewers of the live event. A multimedia player running on a viewer device, requesting the live event, may transmit a request to the data storage service 205 using a unique identifier, such as a URI, associated with the playlist. In response to the request, the MMSFs may be transmitted from the data storage service 205 to the requesting viewer device of the viewer devices 250*a*-5 via the CDN 204 in accordance with the generated playlist. As with FIG. 1, FIG. 2 is intended for illustrative purposes only, and not all components shown in FIG. 2 will be present in all embodiments. For example, in some embodiments the data storage service 205 is not present. In such embodiments, the output files may be stored on the ingest endpoints 230 and 240 in lieu of being stored at the data storage service 205.

The viewer devices 250*a-c* may be any type of device that is configured to request that a code be issued for a user. Further, the viewer devices 250*a-c* may be configured to receive a system-generated or submit the code for validation. For example, the viewer devices 250*a-c* may be any type of consumer electronics device including a laptop or desktop computer, a tablet, a mobile phone or a smartphone, a smart television, a set-top box or a stream player or a network-enabled digital optical disk player, such as a Blu-ray™ player or digital versatile disc (DVD™) player, among others. The viewer devices 250*a-c* may be configured to communicate using any type of communication protocol including a cellular wireless communications protocol, such as fourth generation (4G) communications or long term evolution (LTE™), a wireless local area network (WLAN) communications protocol, such as an Institute for Electrical and Electronics Engineers (IEEE) 802.11, 802.16 or 802.21 communication protocol, or short range communications protocol, among others.

The viewer devices 250*a-c* may be equipped with a processor, such as a central processing unit (CPU) or a graphics-processing unit (GPU), that provides computing functionality to a user. Examples of a CPU include those utilizing a complex instruction set computing (CISC) architecture, such as the x86 CPU, and others that utilize a reduced instruction set computing (RISC) architecture, such as the advanced RISC machine (ARM) CPU. The viewer devices 250*a-c* may also be equipped with one or more input peripherals, such as a touch screen that responds to a fingertip or a stylus input, a physical keyboard, a digital camera, a microphone, a touchpad or a mouse, among others. Furthermore, the viewer devices 250*a-c* may be configured with one or more applications that facilitate receiving voice inputs or voice commands from a user via the microphone or image inputs via a digital camera. In addition, the viewer devices 250*a-c* may also be equipped with one or more output peripherals such as a screen or speakers, whereby if the viewer devices 250*a-c* is equipped with a touch screen, the touch screen may service as both an input and an output peripheral device. The viewer devices 250*a-c* may further be equipped with a global positioning system (GPS) circuitry that enables locating the device. The viewer devices 250*a-c* may further be equipped with an operating system and may be configured to execute software applications and programs compatible with the operating systems.

Note that, while URIs (which specify how to access content, e.g., by specifying a protocol such as HTTP or File Transfer Protocol (FTP)) and Uniform Resource Locators (URLs) are used for the purpose of illustration, other techniques for referencing content may be used. A URI may include a string of characters usable to determine a location of a resource, and a URL may be a particular type of URI usable as a web address. Generally, techniques described and suggested herein include uses of URIs and other references to computing resources (general resource locators) to enable access to services of a service provider. While URIs are used throughout the present disclosure for the purpose of illustration, it should be understood that the techniques described herein are generally applicable to other resource locators (i.e., instances of information usable by a system to locate a computing resource within the system), such as general URIs. Moreover, the techniques described herein are generally applicable to electronic requests and are not limited to HTTP requests, which are used throughout for illustration.

The live multimedia content service 299 may provide various computing resource services to its customers. The services provided by the live multimedia content service 299, in this example, may include a console 222, customer services engine 224, a management dashboard 226, a resource manager 246, an event manager 256, an ingest manager 266, a database service 225, a metrics service 296, a CDN reporting backend 286, a policy engine 220, and a delivery service 215. Not all embodiments described may include the services described with reference to FIG. 2 and additional services may be provided in addition to or as an alternative to services explicitly described.

As illustrated in FIG. 2, the live multimedia content service 299, in various embodiments, includes an ingest manager 266. The ingest manager 266 is configured to create and manage information/metadata related to new MMSFs, failover conditions, MMSF updates, MMSF uploads to the data storage service 205, and other metadata related to the MMSFs and/or publishing streams. The ingest manager 266 is further configured to create and manage database tables related to managed information/metadata, active stream information for a playlist, historical stream information for a playlist, and MMSF information for a playlist.

The ingest manager 266 may receive an API call from an ingest endpoint, such as the primary ingest endpoint 230 and secondary ingest endpoint 240, each time the respective ingest endpoint receives a new MMSF. When the ingest manager receives the API call related to a new MMSF, the ingest manager 266 may create and/or update a database related to new MMSFs, referred to as a segment table. The ingest manager 266 may write a new entry in the segment table for each new MMSF, identify an upload location for the new MMSF in the data storage service 205, and mark the new MMSF in a non-ready state (the non-ready state identifying the MMSF as not being usable at that time). The ingest manager 266, upon receiving the API request regarding a new MMSF, may generate a new MSN for each new MMSF. In some example embodiments, a value for the MSN may be calculated by the ingest manager 266 by the following: the ingest manager 266 may load the MSN for the previous segment in the publishing stream. If the MMSF is the first MMSF in the publishing stream, the MSN may be zero (0). Otherwise, if the current MMSF is consecutive with the previous MMSF, the MSN for the current MMSF is calculated as the MSN of the previous MMSF, plus the number of black or slate multimedia screen segments that exist between the previous MMSF and the current MMSF, plus 1. It must be noted that although the present disclosure refers to MSNs, which is used by HLS, it is contemplated that embodiments are not limited to HLS; rather, as used herein, MLS is contemplated to be any of a variety of identifiers usable for identifying the media segment.

In order to determine the number of black or slate screens between the previous MMSF and the current MMSF, the ingest manager 266 identifies, from the segment table, a start time of the current MMSF, an end time of the previous MMSF, the target duration for the playlist, and target segment size of each MMSF. Based on the identified values, the ingest manager 266 calculates the number of black screens by subtracting the end time of the previous segment from the start time of the current segment and dividing the result by the target segment size. Based on the calculated value of the MSN for the current MMSF, the ingest manager 266 saves the value in the segment table and marks the MMSF in the database as in an initialized state (e.g. the MMSF has been assigned an MSN and is available for use). In one example embodiment, the ingest manager 266 may receive an API call from an ingest endpoint requesting the ingest manager 266 to update the state of a MMSF in the segment table and enter any new metadata provided in the request.

In one example embodiment, the ingest manager 266 may update the state of a MMSF entry in the segment table as follows: The ingest manager 266 may query the segment table to identify a segment entry to be updated, and identify the current time (e.g., current timestamp), the start time of the identified segment, and a delay threshold for the MMSFs for that one event. Based on these identified values, the ingest manager 266 determines if the start time subtracted from the current time is less than the delay threshold, then the ingest manager updates the segment table entry for the current segment to an uploaded state. Otherwise, if the determination is false, the entry is updated to an invalid state. An invalid state may occur, for example, if the MMSF is longer than the delay threshold. An invalid state may also be entered if the delivery service has returned a playlist, to a player, over the same time range as the current segment, but substituted a black screen instead of the current segment. Such issues may occur in various circumstances, such as due to hardware malfunctions of a camera or errors with transmission between a camera and an ingest endpoint or due to other circumstances, such as programming error.

In some example embodiments, in order to support failover logic between publishing streams, when a failover entry occurs, the ingest manager 266 is configured to generate and/or update a database related to the active publishing streams, referred to as an active stream table. The active stream table includes, at least, information related to the customer's account, a segment table identifier, the event information, event history, the active stream, and/or the renditions of the live event. The active stream table may have a hash key, where the hash key may be associated with an account identifier (ID), an event ID, an event history ID, an active multimedia input stream ID, and/or a renditions ID. The active stream table may have a range key, which may be associated with a time stamp. The active stream table may be generated when the failover event occurs, and is generally unnecessary during non-failover conditions because the active stream table is used to store information related to failover events.

In one example embodiment, the ingest manager 266 may receive an API call from an ingest endpoint requesting the ingest manager to determine if a failover condition exists for the MMSF identified in the API call. The ingest manager 266 queries the active stream table to identify the most recent (e.g., the latest timestamp) MMSF entry, in descending order. If the MMSF entry is identified, the primary publishing stream is assigned to be in an active state, and there is zero offset (e.g., no gaps in segments or failover events).

Next, the ingest manager queries the segment table to identify the publishing stream for the most recent (e.g. latest) MMSF entry, in descending order. Based on the queries, a failover event occurs if the most recent MMSF does not exist. A failover event may also occur if the current time is greater than or equal to the end time of the most recent segment, plus the delay threshold. Another method of determining if a failover event has occurred includes identifying an approximate start time for a next MMSF, which estimates that the next segment should be received at the end time of the current segment plus the delay threshold, if the next segment will be received at all. The ingest manager 266 further queries all other publishing streams (e.g., a secondary publishing stream) to identify which publishing stream contains the next available MMSF with a start time that is greater than or equal to the end time of the previous segment and whose start time is greater than the current time minus the delivery pad time. The ingest manager then writes a new entry into the active stream table, which marks a failover event with a timestamp of the start time of the next available MMSF.

In another example embodiment, the ingest manager 266 may receive an API call from an ingest endpoint requesting the ingest manager 266 to generate or insert entries into a playlist time base table. The table may have a hash key associated with an account ID, an event ID, an event history ID, an active multimedia input stream ID, and/or a renditions ID, similar to the active stream table. The playlist time base table may also have a range key, which may be associated with a segment timestamp (without multimedia tags) and may be divided by the number of publishing streams. Each entry in the playlist time base table may contain a given timestamp (as the range key) and a field for the next MSN value after the given timestamp.

The ingest manager 266, at the time a segment is uploaded to the data storage service 205, may insert entries into the playlist time base table based on different conditions. For example, one condition may include if the current MMSF being uploaded to the data storage service 205 is smaller (e.g., shorter in duration) than the event's target segment duration, if so, an entry may be added to the database with a timestamp of the end time of the segment (or a timestamp of the start time plus the segment's duration). As another example, another condition may include if the current segment being uploaded is larger (e.g., longer in duration) than the event's target segment duration, if so, an entry may be added to the database where the segment should have started, meaning the segment's timestamp of the end time minus the event's target segment duration. Note that if the segment is twice as long as the target segment duration or more, an entry may need to be added where each sub-segment should have started. Another condition may include if the current MMSF being uploaded is not consecutive with the previously uploaded segment. If so, an entry may be added to the database with a timestamp of a start time of the segment (this includes the first segment of a publishing stream when the event starts, as a new event will have no previous segment to be consecutive with).

As illustrated in FIG. 2, the live multimedia content service 299, in various embodiments, includes a delivery service 215. The delivery service 215 may include a virtual computer system service instance or fleet of servers running a computing platform. The computing platform may be configured to provide an API and runtime environment for developing and running enterprise software, including, for example, network and web services, and large-scale, scalable, multi-tiered, and secure network applications. The delivery service 215 may include delivery endpoint software that is configured to create an immutable delivery endpoint. The delivery endpoint is an immutable object whose state cannot be modified after it is created. For example, once a delivery endpoint has been created for a specific live event, that delivery endpoint cannot be changed and may be maintained until some period after the live event has completed.

In some example embodiments, the delivery service 215 dynamically generates a playlist or a partial playlist that contains, at least, a URI for each MMSF ordered in sequence to stream the live event. The playlist may be generated from URIs for MMSFs received via a primary multimedia device, on a primary publishing stream and/or URIs for MMSFs received via a secondary (backup) multimedia device, on a secondary publishing stream.

The delivery service 215 may be configured to detect a basis for a failover event and effectuate the procedure for resolving the failover event. A failover event refers to a failure on a publishing stream that necessitates that a secondary publishing stream is used to continue generating the playlist. For example, if there was a failure on the primary publishing stream, the delivery service 215 fails-over to the secondary publishing stream in order to maintain the live event streaming automatically with minimal to no impact for the viewer and without the viewer having to act (e.g., without having to refresh/reload playlist, without having to load a new playlist, etc.). In other words, when the delivery service 215 detects a condition that would cause the live event to fail or be interrupted, the delivery service 215 automatically switches from using MMSFs received from a primary publishing stream to using MMSFs received from a secondary or secondary publishing stream. Possible failures may include failure of a customer's multimedia camera device, a customer's software encoder, a customer's computing device (running the software encoder), a customer's network upload, a virtual computer system service host and/or software, or the like.

The delivery service 215 may be operatively interconnected with a database or database service, such that the delivery service 215 may retrieve (e.g., read) data stored in a database file. The database file may contain metadata or informational tags related to each MMSF received on both the primary and secondary publishing streams. Specifically, the delivery service 215 may read the database file to determine a status of all MMSFs. The status data, provided to the database service 225 from an ingest service or the ingest manager 266 may include information identifying the status of each MMSF as whether it can or cannot be used for streaming the live event and a URI for the MMSF may be added to a playlist.

For example, if the status of a MMSF is identified as positive, the MMSF is viable or acceptable, and the MMSF URI is acceptable to be added to the playlist and to be used by the viewer's multimedia player to stream that segment of the live event. Conversely, if the status of a MMSF is identified as negative, that MMSF is unviable or unacceptable to be used by the viewer's multimedia player to attempt to play that segment of the live event. A MMSF having a negative status may be considered unviable (e.g., unusable as a segment to a playlist) for many reasons. For example, a MMSF may be missing content, missing entirely at a specific time, be out of sequence, be corrupted, be transcoded improperly, or otherwise unusable. For example, if the MMSF were in a state that, if the MMSF URI were added to the playlist, the viewer could experience streaming issues or interruptions when that unviable MMSF was streamed (or attempted to be streamed) by the viewer's player.

The delivery service 215 may generate a playlist for a live event based on the statutes of the MMSFs from both the primary and secondary publishing streams in a manner that dynamically selects only viable MMSFs (i.e., MMSFs identified with a positive status). In some example embodiments, the delivery service 215, when creating a playlist for a live event may determine the status of n number of MMSFs for each of the primary publishing stream and the secondary publishing stream (e.g., determining the status of five MMSFs of both publishing streams) to ensure viable segment files are available on both publishing streams and may be used to generate the playlist.

In another example embodiment, the delivery service 215 may be configured to determine the statuses of MMSFs received only on the primary publishing stream as long as the status of each MMSF is identified as positive. If the delivery service 215 identifies a MMSF with a negative status, the delivery service 215 is further configured to read the statuses of the MMSFs of the secondary publishing stream. In such an example, the delivery service 215, upon identifying an unviable MMSF in the first publishing stream, may begin identifying/reading the statuses of the MMSFs of the secondary publishing stream at the same segment location (e.g., the first MMSF of the primary publishing stream and the first MMSF of the secondary publishing stream).

The delivery service 215 may further begin identifying/reading statuses of MMSFs of the secondary publishing stream based on a time of the live event or a time of a MMSF. The time of a MMSF may be expressed as a time having elapsed since a specified epoch. For example, if in sequential time, a MMSF of the primary publishing stream is identified as unviable at live event time 01:15:14, the delivery service 215 may begin reading the status of the MMSFs of the secondary publishing stream at or before the time identified. In other words, the delivery service 215 may begin reading the statuses of the MMSFs of the secondary publishing stream at live event time 01:15:14, 01:15:13, or earlier (if desired by a system administrator or the like), in order to determine if an MMSF URI of the secondary publishing stream is identified as viable when the corresponding MMSF of the primary publishing stream was identified as unviable. Playlist generation is depicted and described in greater detail in connection with FIGS. 6 and 7.

Once the delivery service 215 determines a MMSF of the secondary publishing stream is viable for the missing segment, the delivery service 215 dynamically generates (or updates) the playlist to add the MMSF from the secondary publishing stream instead of the unviable MMSF from the primary stream. In the environment 200 illustrated in FIG. 2, a customer console 222 is included. The customer console 222 can be used by a customer (e.g., owner/operator of the live event) for event management, live streaming controls (e.g., bitrate, viewer access, etc.), camera settings (e.g., camera preview), live event analytics, and other reports. The customer console 222 may be further depicted and described in connection with FIGS. 9-11.

The live multimedia content service 299, in various embodiments, further includes a customer services engine 224. The customer services engine 224 may include customer support services, such as identification and diagnostics of live multimedia streaming problems, validation of customer software encoders and/or multimedia players, recommendations for software encoder configurations, and additional services for customers creating and publishing live events. The live multimedia content service 299 may further include a resource manager 246, which may include an instance for managing and allocating computing resource service provider resources for a live event. The live multimedia content service 299 may include an event manager 256, which may include a web service configured to manage live event metadata and to provide control of the creation and running (e.g., starting and stopping) of the live event.

In addition, a metrics service 296 may be included in the content service 299. The metrics service may receive input metrics, such as bandwidth data, dropped or missing MMSFs, timestamp drift (e.g., a difference between the event and reception timestamps), and the like. The metrics service 296 may collect and display real-time and historical metrics and may be displayed in a user interface console, such as the user interface console 1000 depicted and described in connection with FIG. 10. The metrics may include bitrate information, device type, browser type, re-buffering frequency and percentages, peak concurrent views, unique viewers, minutes streamed, minutes streamed per unique viewer, and other metrics specific to multimedia live event streaming. The metrics service 296 may further provide information regarding the regularity of MMSFs being generated, consistency of segment break points across renditions, and the like. The metrics service 296 may receive metrics data from an ingest endpoint, such as primary ingest endpoint 230, which may record metrics data at a decided time interval (e.g., every two second). The ingest endpoint metrics data may include real-time or near real-time metrics on particular publishing streams, for example.

The live multimedia content service 299 may further include the CDN reporting backend 286. The CDN reporting backend 286 may include a computing resource monitoring service that is configured to collect and aggregate file-level metrics. For example, such metrics may include live event oriented metrics such as the number of live stream views versus the number of individual MMSF requests.

The live multimedia content service 299 additionally maintains a database service 225 for its customers. A database service 225 may include a collection of computing resources that collectively operate to run one or more databases for one or more customers. The database service 225 may include databases or tables for use by or generated by the delivery service 215, ingest manager 266, and additional services of the live multimedia content service 299. For example, the database service 225 may include data tables such as the segment table, the active stream table, and the playlist time base table.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 3:
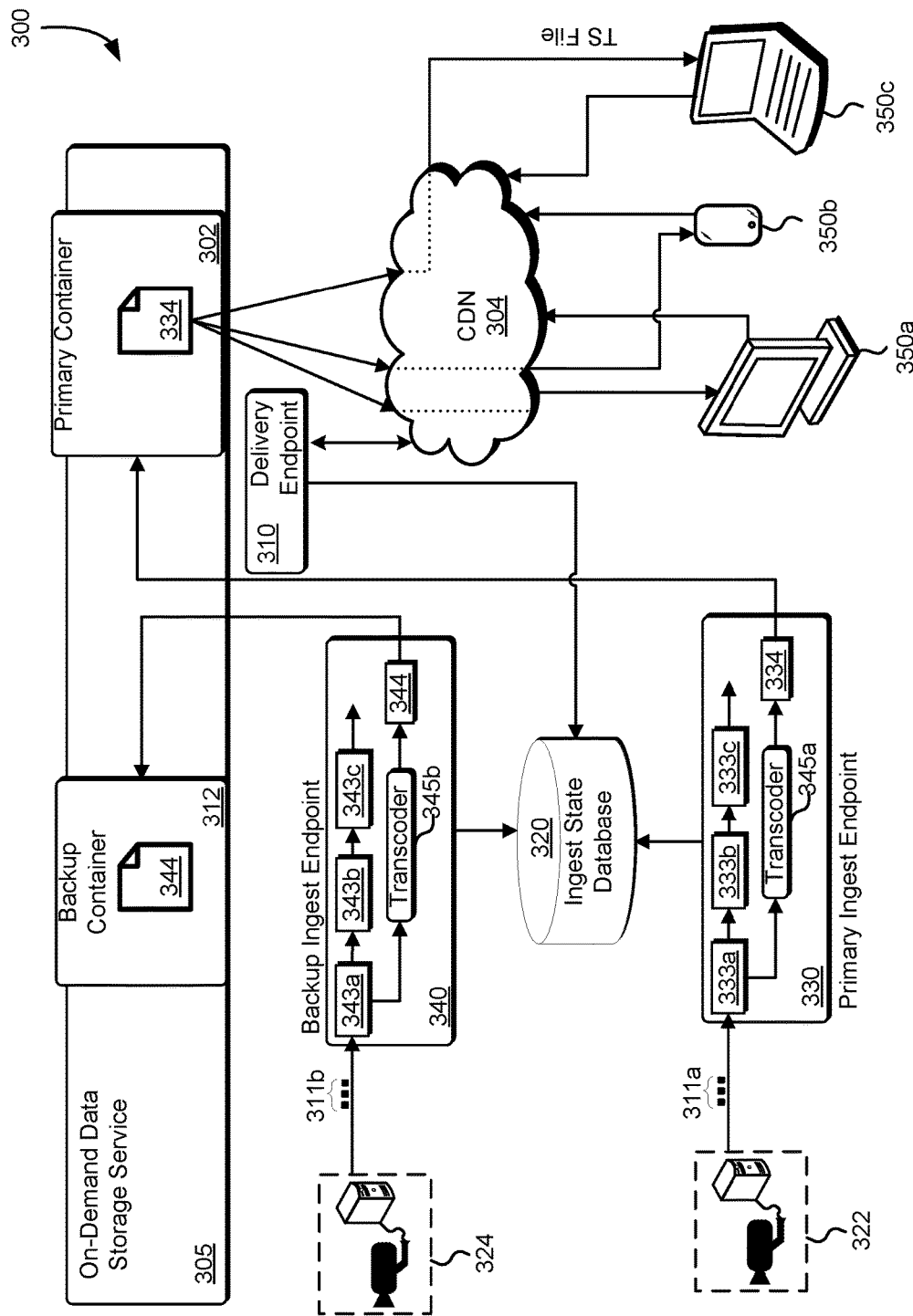
FIG. 3 is an illustrative example of an environment showing video segments received from multiple input devices being delivered to multiple viewer streaming devices in accordance with at least one embodiment.

FIG. 3 is an illustrative example of an environment 300 showing video segments received from multiple input devices being delivered to any number of streaming devices in accordance with at least one embodiment of a data storage service 305. A live event customer receives an ingest endpoint URI for publishing the live event to an ingest endpoint of a virtual computer system service. The ingest endpoint URI is used by the customer's primary and backup multimedia recording devices 322 and 324 to publish primary and secondary publishing streams 311*a* and 311*b* to the primary and backup ingest endpoints 330 and 340. In one example embodiment, a single ingest endpoint URI is used by both customer devices in order to direct both publishing streams to the respective ingest endpoints. In another example embodiment, a first ingest endpoint URI directs the primary publishing stream to the primary ingest endpoint 330 and a second ingest endpoint URI directs the secondary publishing stream to the backup ingest endpoint 340.

A primary multimedia recording device 322 publishes the primary publishing stream 311*a* to the primary ingest endpoint 330, the received multimedia input segments 333*a-c* are transcoded, by a transcoder 345*a*, to generate MMSFs 334. The MMSFs 334 are uploaded to a logical data container 302 in a data storage service 305. In parallel with processing of the primary publishing stream 311*a*, a backup multimedia recording device 324 publishes a secondary publishing stream 311*b* to a backup ingest endpoint 340. The backup ingest endpoint 340 provides the received multimedia input segments 343*a-c* from the secondary publishing stream 311*b* to a transcoder 345*b*, which converts the multimedia input segments 343*a-c* into MMSFs 344. The backup ingest endpoint 340 uploads the MMSFs 344 to a logical data container 312 in the data storage service 305. The primary ingest endpoint 330 and the backup ingest endpoint 340 provide metadata received in the multimedia input segments 333*a-c* and 343*a-c* and information for the storage location of each MMSF to an ingest state database 320, which is accessed by a delivery endpoint 310 in order to generate a playlist for the live event. As with FIGS. 1 and 2, FIG. 3 is intended for illustrative purposes only, and not all components shown in FIG. 3 will be present in all embodiments. For example, in some embodiments the data storage service 305 is not present. In such embodiments, the output files may be stored on the ingest endpoints 330 and 340 in lieu of being stored at the data storage service 205.

The primary ingest endpoint 330 and the backup ingest endpoint 340 are configured to include a transcoder and/or transmuxing engine 345a and 345b. Transcoding is generally performed when a target device, such as a multimedia viewing device of the multimedia viewing devices 350a-c, does not support the format or has limited storage capacity that mandates a reduced file size or to convert incompatible or obsolete data to a better-supported or modern format. For example, the transcoders 345a-c may be configured to convert/transcode multimedia files from their source format into versions that will playback on different device types. The transcoders 345a-b may use transmuxing for live and/or on-demand streaming to certain players. Transmuxing is offered by streaming servers and CDNs, which dynamically re-wrap the input file into a transport stream chunk and create a manifest file (e.g., playlist). Note, however, that in some examples, transcoding and transmuxing may occur at different locations than illustrated in FIG. 3, such as at the CDN 304 or at another location between the source of the video and the final destination to which the video is delivered which, from the point of view of a device (e.g., 350a, 350b, or 350c) to which content is being delivered, before the CDN 304.

The transcoders 345a-b may further include adaptive bitrate streaming that uses informational tags or other data stored in a playlist file to choose between different renditions or alternate renditions (e.g., at different bitrates) of the same content. The transcoding service enables generation of segmented multimedia files and associated playlists for video streaming, where the segmented multimedia files, also referred to as segments or blocks, each contain several seconds (e.g., 2, 5, 10, etc.), of multimedia content, which may or may not be encoded.

A delivery endpoint 310 may include one or more virtual computer system service instances, a collection of computing resources, or fleet of servers configured to instantiate virtual machine instances on behalf of the live content owner/operator. The delivery endpoint 310 may dynamically generate a playlist for the live event. Each playlist may contain a number, n, of URIs pointing to individual video segment files or MMSFs. For example, the playlist may contain URIs of the four most-recent MMSFs of the live event stored at the data storage service 305. The delivery endpoint 310 is configured to retrieve information related to the live event from an ingest state database 320 in order to generate the playlist.

A CDN 304, like the CDN 204 of FIG. 2, may include a large distributed system of proxy servers deployed in one or more data centers via the Internet. The CDN 304 may be used to provide and serve content, such as multimedia content, to end-users with viewer devices, such as one of your devices 350a-c. The CDN 304 may be used to provide multimedia live event streaming between customers and viewers of the live event. A multimedia player running on a viewer device, requesting the live event, may transmit a request to the data storage service 305 using a unique identifier, such as a URI, associated with the playlist. Based on the request received via the CDN 304, the MMSFs may be transmitted from the data storage service 205 to the viewer device via the CDN 204 in accordance with the generated playlist.

In alternative example embodiments, a customer may operate a single multimedia recording device for recording and publishing a live event (as opposed to the two or more multimedia recording devices as used in the majority of presented embodiments). In such an embodiment, the single multimedia recording device, such as multimedia device 322, may be configured to record the live event and transmit a publishing stream to two ingest endpoint instances. For example, the multimedia recording device may transmit the single publishing stream to primary ingest endpoint 330 and to backup ingest endpoint 340. In other words, both the primary ingest endpoint and the backup ingest endpoint may be configured to receive the same publishing stream of a live event from a single multimedia recording device. This configuration can still allow for protecting against failures due to factors other than related to the multimedia device 322, for example.

In the alternative embodiment, the primary ingest endpoint 330 and the backup ingest endpoint 340 are further configured to determine if a failover event is present, for example, if a failure of the primary ingest endpoint 330 occurs, the customer's multimedia recording device software, such as a customer's software encoder, may be automatically reconnected to the backup ingest endpoint 340. Providing failover detection at an ingest endpoint, during a live event using a single publishing stream, enables the failover decision to occur during the receipt of multimedia data and before data is stored in the data storage service 305 (as opposed to when a request for a playlist is made by a viewer of the content). For example, if the primary ingest endpoint 330 detects a failure at that ingest endpoint, a failover operation is performed to switch the single publishing stream being received at the failed primary ingest endpoint to then being received at the backup ingest endpoint 340. In performing the failover procedure upon receiving a publishing stream at the ingest endpoint (as opposed to performing the failover procedure at the time of the request for a playlist), if a failure of the primary ingest endpoint 330 occurs, the delivery endpoint 310 may be configured to use only the publishing stream received at the backup ingest endpoint 340 to generate a playlist for the live event (thereby preventing, for example, a race condition).

Figure 4:
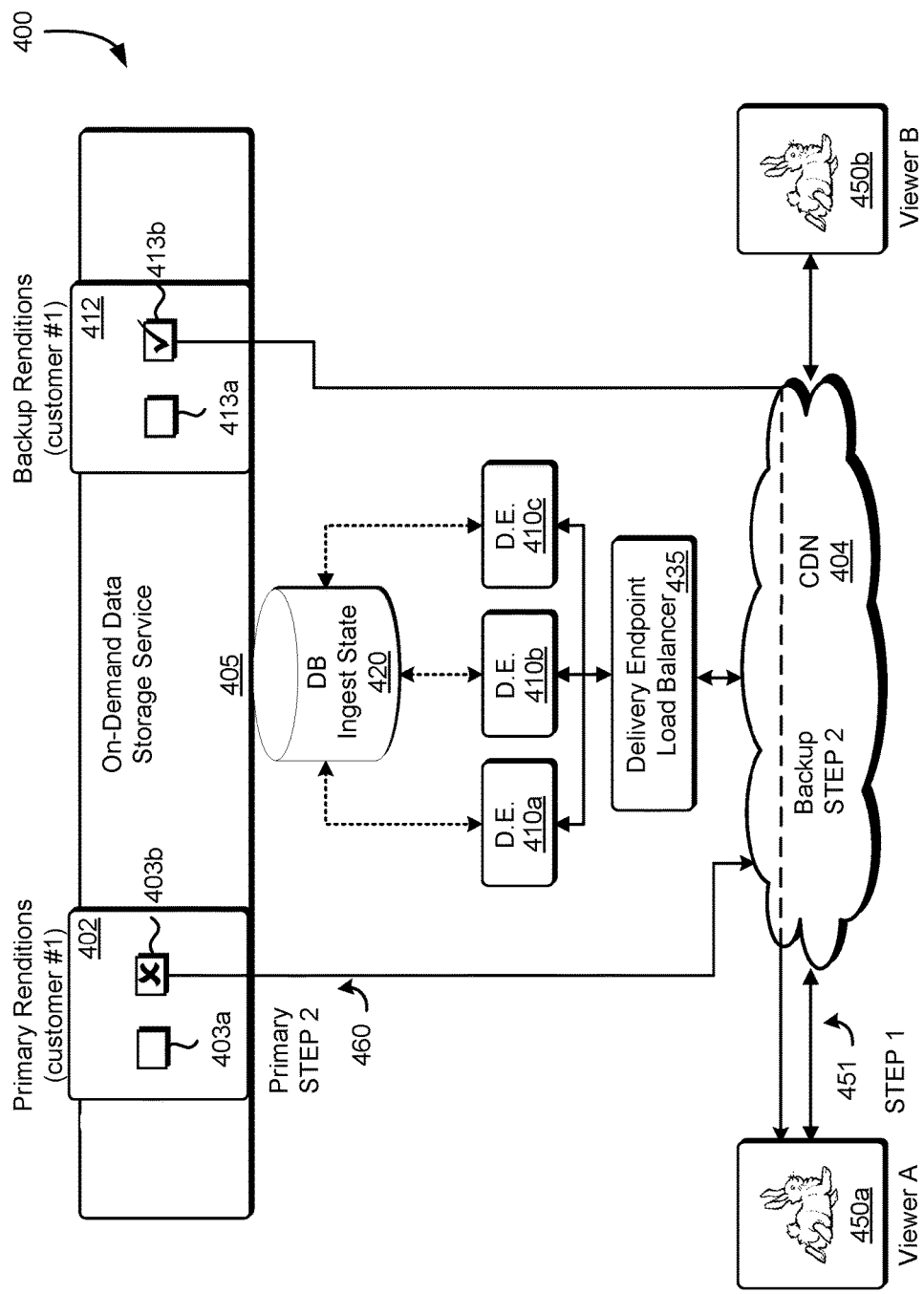
FIG. 4 is an illustrative example of an environment showing viewer requests for live event playlists in accordance with at least one embodiment.

FIG. 4 is an illustrative example of an environment 400 showing viewer requests for live event playlists in accordance with at least one embodiment. As a live event is recorded and published according to example embodiments, segments of multimedia input streams are received from customer recording devices and may be accumulated in a data storage service 405. Primary and backup multimedia input streams are received at ingest instances and transcoded in parallel, resulting in a complete set of MMSFs in a primary logical data container 402 and a backup logical data container 412. The MMSFs 403a-b and 413a-b may be stored incrementally in the data storage service 405. The ingest instances, such as primary and backup ingest endpoints 330 and 340 as described and depicted in connection with FIG. 3, update a database ingest state 420 as the MMSFs are uploaded to the data storage service 405. The database is updated, by the ingest instances, with information related to each MMSF.

A delivery endpoint, such as one of delivery endpoints 410a-c, reads information stored in the database 420 in order to generate and deliver a playlist for the live event. The delivery endpoints 410a-c detect failure events, based on the information in the database 420, and fail over a playlist to a backup rendition (e.g., the logical data container 412) if a failure event is detected in the primary rendition (e.g., the logical data container 402).

In an example embodiment, players 450a and 450b, which may include multimedia players running on one or more viewers' computing devices, request a playlist for a live streaming event. The players transmit a request to a delivery endpoint via the CDN 404 using a public streaming URI for the specific live event (step 1) 451. The request for a playlist may be transmitted to one of the delivery endpoints 410*a-c*, based on the event's playlist URI, via a delivery endpoint load balancer 435, which may be used to balance requests based on the number of viewers of the live event. The origin for the playlist URI may be a delivery endpoint, such that the same playlist is cached and made available across multiple viewers (e.g., viewer 450*a* and viewer 450*b* receive the same playlist when the request for a playlist is received at the same delivery endpoint).

One of delivery endpoints 410*a-c* generates a playlist by retrieving information from a database ingest state 420 to determine the location of available MMSFs and adds the location of the MMSFs to a playlist. In the example embodiment of FIG. 2, a delivery endpoint will generate a playlist based on MMSFs from the primary rendition 402 unless a segment is missing or invalid. In the environment 400, MMSF 403*b* is depicted as being unavailable ("X"). The MMSF 403*b* being unavailable may cause a failover event to occur. As a result of the occurrence of the failover event, one of the delivery endpoints 410*a-c* may generate the playlist to include the corresponding MMSF from the secondary rendition. In other words, the MMSF 403*b*, if available, would be transmitted to viewer A according to primary step 2 (460). However, if, according to information stored in the database 420, the MMSF 403*b* is unavailable, one of the delivery endpoints 410*a-c* generates a failover playlist that provides the location of MMSF 413*b*, which is depicted as available ("✓").

A playlist or a partial playlist may be transmitted to the viewer via a content delivery network 404 based on a viewer request received at a delivery service (or a delivery endpoint of a delivery service). The playlist may include a metadata tag or informational tag specifying a subset of MMSFs, the subset of files may include, for example, the first five segments of a publishing stream for the live streaming event. The playlist may be dynamically generated (e.g., continuously updated) as the MMSFs are received and stored in the data storage service 405. As the live event continues, the next time the same unique URI for the live event is reloaded by a viewer's player, the playlist may include a metadata tag specifying a new subset of MMSFs, for example, such as segments 40-45 of the live streaming event. Each playlist provides the most recent n URIs pointing to individual MMSFs for the next portions of the live event.

A viewer device, such as one of the viewer devices 450*a-b*, may receive the live event streaming content, such as audio/visual content, from the data storage service 405 via the CDN 404. The viewer devices 450*a-b* may receive the live event stream in different data content formats, based on the type of multimedia player running on the particular viewer device. The streaming session may use a content delivery protocol for streaming audio, video, and data between a client device running a multimedia player and a server over the Internet. The viewer device, which may include a laptop computer, smart-phone, or tablet computer, among others, may receive content as part of the session for rendering on the viewer device. The content may be delivered over a network, such as the Internet, utilizing an underlying Internet protocol, such as Transmission Control Protocol/Internet Protocol (TCP/IP) or User Datagram Protocol (UDP), among others. Further, the content may be encoded or compressed in accordance with a lossy or lossless encoding scheme, such as any Moving Picture Experts Group (MPEG) protocol, among others. In addition to the utilized Internet protocol or encoding or compression scheme, the content may be delivered in accordance with a content delivery protocol. The content delivery protocol may facilitate delivering the encoded content over an Internet infrastructure in a continued or uninterrupted manner.

Figure 5:
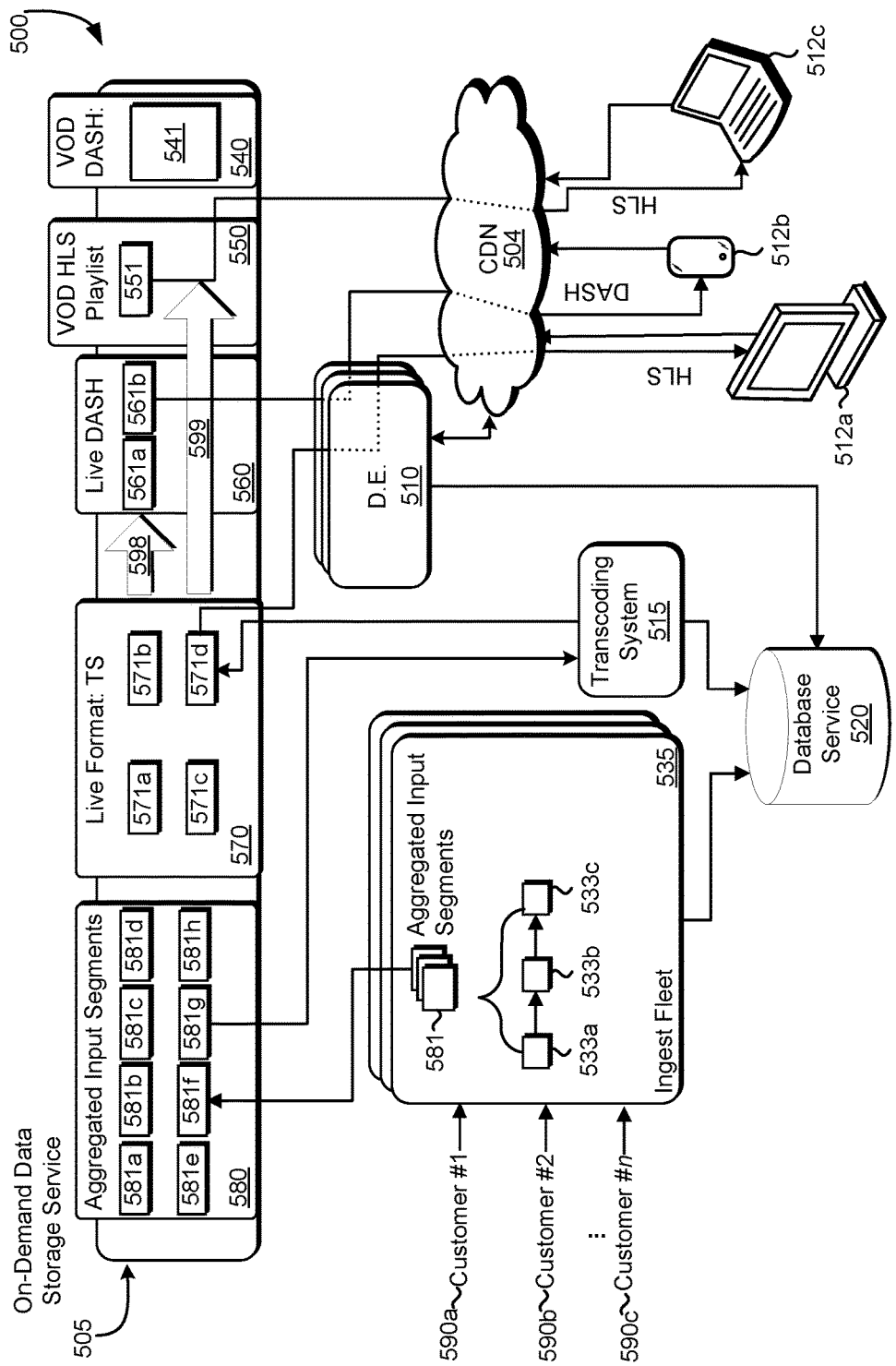
FIG. 5 is an environment illustrating a multi-tenant live multimedia content service with distributed live event transcoding in accordance with at least one embodiment.

FIG. 5 is an illustrative example of an environment 500 showing a multi-tenant live multimedia content service with distributed live event transcoding in accordance with at least one embodiment. Similar to FIG. 3, the environment illustrated in FIG. 5 provides for a live multimedia content service for receiving multiple publishing streams from multiple customers at an ingest fleet 535, such as a fleet of servers or instances of a virtual computer system service. The ingest fleet 535 may include or employ one or more web servers configured to receive incoming multimedia input for streaming audio, video, and data (e.g., RTMP). The ingest fleet 535 may further include or be operatively interconnected to one or more ingest endpoints, such as ingest endpoints 230 and 240 and/or an ingest manager, such as ingest manager 266 as described and depicted in connection with FIG. 2.

In one example embodiment, a multi-tenant ingest fleet 535 is configured to receive multiple publishing streams for multiple live events (e.g., multiple events from one customer or multiple events from multiple customers) at a single ingest endpoint of the ingest fleet 535. For example, each customer, such as customer 1 (590*a*), customer 2 (590*b*), or customer n (590*c*), is provided with an ingest URI for a shared ingest endpoint, which receives all customer live event input (e.g., publishing streams for live events). The multi-tenant architecture further includes a single delivery endpoint 510, which is configured to generate playlist files for multiple live events at the same time (as opposed to having an individual delivery endpoint for each live event). The playlist may be transmitted to the viewer devices 512*a-c* from the delivery endpoint 510 via a content delivery network 504.

The customer publishing streams are received at the ingest fleet 535 as media input segments 533*a-c*, which are aggregated for each customer's live event. The aggregated input segments 581 are stored in a logical data container of a data storage service 505. The data storage service 505 may store aggregated input segments for a live event in one or more logical data containers. The aggregated input segments 581*a-h*, stored in an aggregated input segment logical container 580 for the live event, may be transcoded, by a transcoding system 515, based at least in part on the export file type definitions provided by an application, such as a multimedia player of a viewer's device. For example, a camera input feed may be transcoded and streamed to a multimedia player based at least in part on video formats accepted by the multimedia player.

The transcoding system 515 may include a multi-tenant transcoding system for distributed and/or incremental live event transcoding. The transcoding system 515 receives/retrieves one or more aggregated input segments from the data storage service 505 in order to convert the MMSFs from a first multimedia content format to a second multimedia content format. The second multimedia content format may be a content delivery protocol, such as HLS, MSS, HDS, and DASH. It is noted that FIG. 5 is intended for illustrative purposes only, and not all components shown in FIG. 5 will be present in all embodiments. For example, in some embodiments the data storage service 505 is not present. In such embodiments, the output files may be stored at the transcoding system 515 in lieu of being stored at the data storage service 505.

For example, the transcoding system 515 may retrieve one or more of the aggregated input segments 581a-h and convert the aggregated input segments 581a-h to a transport stream format, such as in the format of transport stream segments 571a-d. The converted transport stream may be transmitted from the transcoding system 515 to a live format logical data container 570 for the live event. The transcoder system 515 may further be connected to a database service 520 in order to provide input segment format information to the databases for use by other services, such as the ingest fleet 535 or the delivery endpoints 510.

The HLS transport stream segments 571a-d may be further converted, according to a transmuxing process 598 in order to convert the segments into another format, such as a HLS DASH segments 561a-b, which may be stored in the live DASH logical container 560. The HLS DASH segments 561a-b may be converted as one or more movie files for dynamic streaming, where the video quality automatically adjusts to changes in bitrate/bandwidth. The HLS transport stream segments 571a-d may further be compiled or stitched together 599 for use by a video-on-demand (VOD) device using VOD HLS playlist format and/or VOD DASH format. The VOD HLS playlist 551 may be stored in a VOD HLS logical container 550 associated with the live event. The VOD DASH segment file 541 may be stored in the VOD DASH logical container 540 associated with the live event. Note that the delivery endpoint 510 only needs to dynamically generate playlist for live stream events, and in embodiment may not be involved in generating video-on-demand playlists. Thus, it can be seen in the environment 500 that VOD HLS playlist 551 may be transmitted directly to the viewer device 512c via the CDN 504.

Once the MMSFs are stored in logical data containers in the data storage service 505 associated with the live event, the viewer devices 512a-c may access the MMSFs according to the content format for the specific viewer device. For example, the viewer device 512a receives the live event video segments from the HLS transport stream logical container 570, the viewer device 512b receives the live event video segments from the HLS DASH logical data container 560, and the viewer device 512c receives the live event video segments from the VOD HLS playlist logical data container 550.

Figure 6:
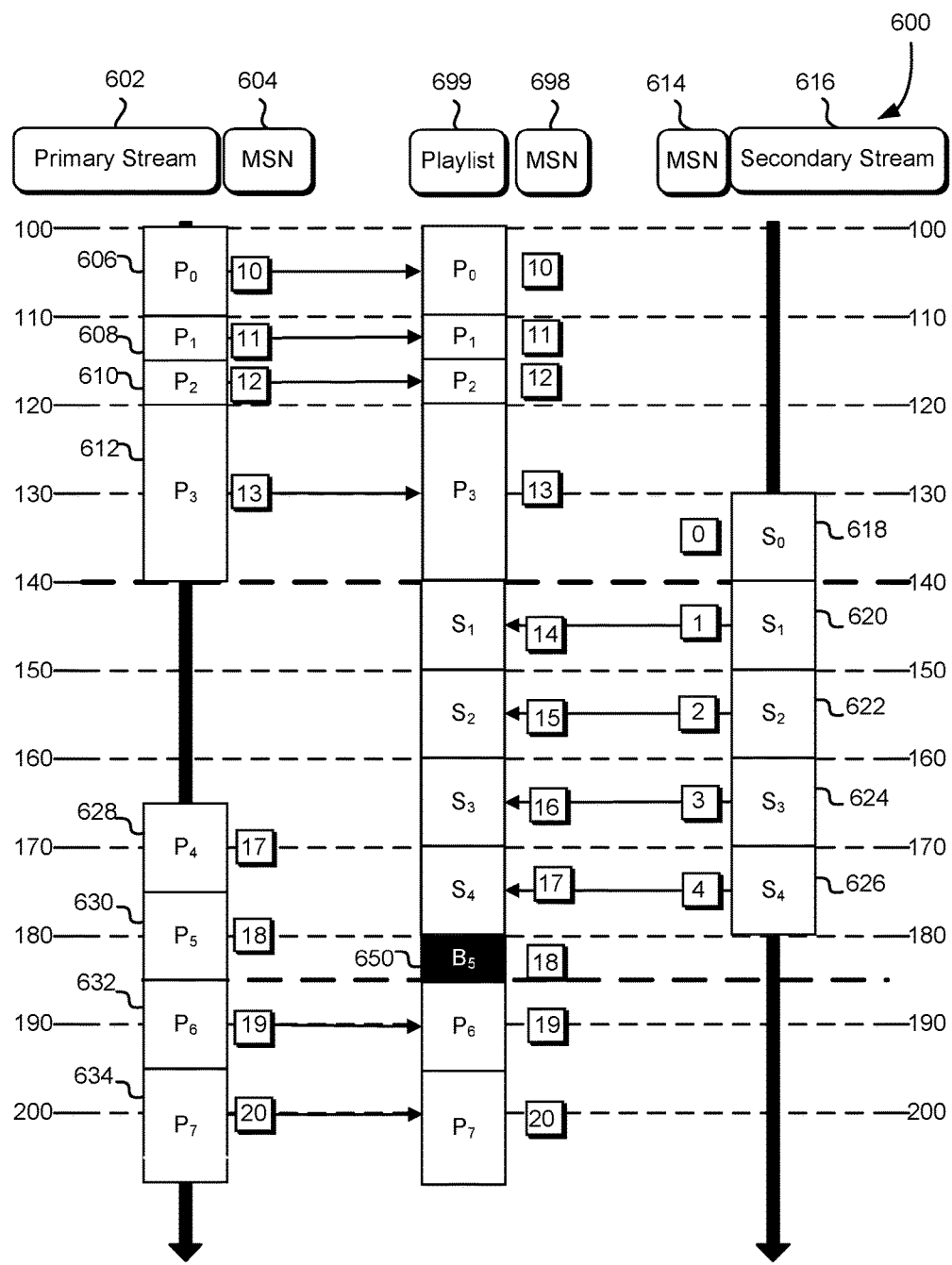
FIG. 6 is an illustrative example of a block diagram showing a live event playlist in accordance with at least one embodiment.

FIG. 6 is an illustrative example of a block diagram 600 showing a live event playlist in accordance with at least one embodiment. A playlist may include a list of URIs for each MMSF (referred to as a media URI) in a specific order and may contain metadata/information related to each one of the segments. When a playlist is created or updated, a series of variables must be determined and/or calculated in order to properly generate the playlist for the live event. Below are a description of applicable variables for one example embodiment; however, additional variables may be used in generating a playlist.

A playlist length is a number of MMSFs that may be identified, by the media URI for each segment, in the playlist. A target playlist length may be a chosen number of media URIs to add to the playlist for that specific live event. The target playlist length may act as a minimum number of media URIs, such that a playlist may be generated with more than the target number of media URIs, but will not generate a playlist with fewer media URIs than the target playlist length. For example, a target playlist length of four may correspond to four media URIs in the playlist. Each time the playlist is updated, a number n of the media URIs may be removed from the playlist and a new number z of media URIs may be added to the playlist, where the number of new media URIs added to the playlist must be four or more.

A segment size is a duration (e.g., length of time) for each MMSF, which may be determined by the ingest manager in order to divide the publishing stream into smaller MMSFs of the same duration. A playlist for a live event may have a specified or target segment size, which may be a specific duration (e.g., 2 seconds) for each MMSF. A maximum segment size may be determined for each live event, where the maximum segment size is the maximum valid segment duration for the live event. Certain transcoders, such as Ffmpeg, may generate segments, from the publishing stream, that are longer in duration than the target segment size for that live event. Therefore, for each live event, a maximum segment size may be determined such that no segment may be longer than x seconds (or other time increment) in duration. For example, if a target segment size is 10 seconds, a maximum segment size may be set as 20 seconds.

A broadcast delay may include a time delay between a time the event is filmed by the input camera and a time the event is delivered to the viewer. The broadcast delay may fluctuate for each event based on a number of considerations (e.g., number of viewer requests, status of network, etc.). An extra broadcast delay, which is a variable in addition to the broadcast delay, is any specified delay of time to be set between the time the event is filmed by the input camera and the time event is delivered to the viewer. A segment handling delay may include a maximum amount of time allowed for a MMSF to be stored to a data storage service, including any associated API calls and other handlings (e.g., potential number of retries) for the MMSF. The values of the target segment size, target playlist length, extra broadcast delay, maximum segment size, and the segment handling delay may be used to determine additional calculated values relevant and/or necessary for generating a playlist.

A minimum playlist duration may be the shortest duration of time determined for each playlist. The minimum playlist duration may be determined by multiplying the target playlist length value by the target segment size value (e.g., if the target playlist length=3 segments and the target segment size=10 seconds, the minimum playlist length=30 seconds). When a playlist is generated using a target playlist length that does not meet the minimum playlist duration (e.g., if one or more of the MMSFs is shorter in duration than the target segment size), earlier (e.g., previously used) MMSFs may be prepended to the playlist in order to generate a playlist that satisfies the minimum playlist duration.

A segment delay threshold may be a maximum allowed time difference between a start time of a current segment (or an end time of the previous segment) and the actual time the segment is stored in the data storage service. If the upload time is greater than the segment delay threshold for that playlist, the segment may be considered too late in time to be used in the playlist and may be marked as invalid in a data table. The segment delay threshold may be determined by adding the maximum segment size value, the extra broadcast delay value, and the segment handling delay value (e.g., if the maximum segment size=20 seconds, the extra broadcast delay=0 seconds, and the segment handling delay=10 seconds, then the segment delay threshold equals 30 seconds).

A delivery look-ahead time may include a padding time allotted between a time when a failover is recorded in a data table and a time when the delivery service will generate a playlist that could contain the failover. The delivery look-ahead time is important for determining failover because as a method for determining whether a failover event has occurred (referred to as a "failover method") is executed, the failover method uses the segment delay threshold to determine which segments to use based on the time of segments were stored. For example, if the segment delay threshold is 30 seconds, the failover method uses segments stored 30 seconds before the current time, and not at segments stored on or around the current time (i.e., the time the failover method is executed). In other words, when a failover event is recorded in a data table, the failover event has a timestamp of the segment delay threshold (the time the failover event should have occurred) rather than the current time the method is run. As such, the delivery look-ahead time may be set as at least one segment size, the maximum segment size, or another size determined in order to avoid and/or manage a race condition between the time when the failover was recorded and the time the playlist is generated.

A delivery pad time may include a time difference between the actual current time and the time that the delivery service is generating a playlist for. The delivery pad time may be calculated by adding the segment delay threshold value and the delivery look-ahead time value. For example, if the segment delay threshold value=30 seconds and the delivery look-ahead time value=10 seconds, then the delivery pad time=40 seconds.

Each media URI in a playlist must have a unique identification number, such as an MSN. The MSN may begin at any value, but it must be incremented by 1 for each MMSF removed from the head of the playlist; this provides a unique identifier for each segment. In other words, the MSN of a media URI for a segment is equal to the MSN of the URI that preceded it, plus one. In the playlist, metadata may be used to assign a MSN to each playlist URI to the MMSF URIs. The URIs contained in the playlist enable a client, such as a multimedia player running on the client device, to receive each MMSF of the live event once the client device makes a network request to a data storage service using the delivery playlist URI for the event. In generating a playlist, a delivery service such as the delivery service 215 described and depicted in connection with FIG. 2, uses data stored in tables, such as the segment table, active stream table, and playlist time table (also described in connection with FIG. 2) store in the data storage service to generate the playlist. The block diagram illustrated in FIG. 6 is a visual representation of a playlist generation using at least some of that data.

FIG. 6 shows a primary stream 602 that includes eight segments ($P_0$-$P_7$), with each of the segments having a corresponding MSNs 604, and a secondary (or backup) stream 616 that includes five segments ($S_0$-$S_4$), with each of the segments having a corresponding MSNs 614. The primary stream 602 and the secondary stream 616 are used to create a resulting playlist 699, which includes segments from each stream and associated resulting MSNs 698 for that specific playlist. For the example embodiment of FIG. 6, the playlist variables, as described above, are set/calculated as the following values: Target Segment Size: 10 seconds, Target Playlist Length: 3 segments, Extra Broadcast Delay: 0 segments, Maximum Segment Size: 20 seconds, Segment Handling Delay: 10 seconds, Delivery Look-Ahead Time: 10 seconds, Minimum Playlist Duration: 30 seconds, Segment Delay Threshold: 30 seconds, and Delivery Pad time: 40 seconds.

The delivery service dynamically generates the playlist 699 to include segments that are identified as valid and ready. From the primary stream 602, media URIs for each of segment $P_0$ 606 (start timestamp 100, end timestamp 110), segment $P_1$ 608 (start timestamp 110, end timestamp 115), segment $P_2$ 610 (start timestamp 115, end timestamp 120), and segment $P_3$ 612 (start timestamp 120, end timestamp 140) are added to the playlist. For the generated playlist 699, new MSNs are assigned for each segment, where the MSNs for $P_0$-$P_3$, are 10-13, respectively.

At timestamp 140, the primary stream failed to transmit a next segment, thereby causing a failover event at timestamp 140. Based on the failover event, the delivery service may continue to generate the playlist 699 using segments received from the secondary stream. The secondary stream failed to transmit any segments before timestamp 130 and the first segment, $S_0$ 618 (start timestamp 130, end timestamp 140) is unnecessary as the media from that stream between timestamp 130 and end timestamp 140 is already added to the playlist from primary stream segment $P_3$. Based on this, the delivery service continues to generate the playlist 699, using secondary stream 616, to include media URIs for each of segments $S_1$ 620 (start timestamp 140, end timestamp 150), $S_2$ 622 (start timestamp 150, end timestamp 160), $S_3$ 624 (start timestamp 160, end timestamp 170), and $S_4$ 626 (start timestamp 170, end timestamp 180). New MSNs are assigned to segments $S_1$-$S_4$ (MSNs 14-17 respectively).

After failing over from the primary stream to the secondary stream, the delivery service does not automatically switch back to the primary stream (from the secondary stream) even after the primary stream recovers from the failover at segment $P_4$ 628, unless the secondary stream fails as well. At timestamp 180, the secondary stream failed to transmit a next segment, thereby causing a second failover event. Based on the failover event, the delivery service may continue to generate the playlist using segments received from the primary stream. At timestamp 175, the primary stream transmitted segment, $P_5$ 630, which had an end timestamp of 185. A segment may not be added to a playlist after the start timestamp of the segment, as such, there is no data available to be added to the playlist between timestamps 180 and 185. As there is no available data on the primary stream, the second stream cannot failover at timestamp 180.

When a gap in data occurs, the delivery service may add a media URI to a black or slate segment to the playlist in order to fill the playlist. In some examples, "slate" may refer to a default image or video clip that can be shown in place of a missing or skipped segment (e.g., "We'll be right back," "Experiencing Technical Difficulties. Please Stand By," "We Apologize for the Inconvenience," etc.). In some cases, the slate may be provided/uploaded by the customer to the computing resource service provider as a customized image/message to be used to fill gaps in the stream/playlist. At timestamp 180, a media URI for a black segment $B_5$ 650 is added to the playlist. As the next available whole segment from the primary stream becomes available at timestamp 185, the black segment is only inserted from timestamp 180 to timestamp 185 and is assigned a playlist MSN of 18. The playlist may include slate or black screen segments of dynamic sizes. The black screen segments may be generated on the fly or the black screen segments of all sizes may be pre-generated. Pre-generated black screen segments may have segment durations of 0.1 or 0.01 seconds up to the live event segment duration.

At timestamp 185, the primary stream receives a segment $P_6$ 632, at which point the delivery service is configured to failover from the secondary stream to the primary stream. The delivery service continues to generate the playlist, using primary stream 616, to include media URIs for each of segments $P_6$ 632 (start timestamp 185, end timestamp 195) and $P_7$ 634 (start timestamp 195, end timestamp 205). New MSNs are assigned to segments $P_6$ and $P_7$ (MSNs 19 and 20, respectively). The playlist 699 is now completed for timestamps 100-205. As the playlist is constantly reloaded by a viewer's player (via the immutable delivery playlist URI for the live event), the newly generated playlist 699 is available for the viewer's player to use for locating segments $P_0$-$P_3$, $B_5$, $P_6$, and $P_7$ of the live event in the data storage service.

The playlist may reside in memory at the delivery service, and each successive playlist may be an update of the playlist resident in memory. Thus, when a viewer device requests a playlist located at the immutable delivery URI, the delivery service may then retrieve the current playlist from memory. In this manner, the playlists may be updated and the current playlist may be retrieved without the media player having to update the URI from which it is requesting the playlist. In some embodiments, each playlist has an MSN unique to the MSNs of other playlists. For example, an MSN for a current playlist may be an increment (e.g., by one) from an MSN of a playlist that immediately preceded the current playlist. Note that in some implementations, the MSN is not strictly incremented by one, but may instead be incremented by one for every segment removed from the previous playlist. For example, if n segments are removed from a first playlist when generating a second playlist, the MSN of the second playlist may be the MSN of the first playlist, incremented by n.

Figure 7:
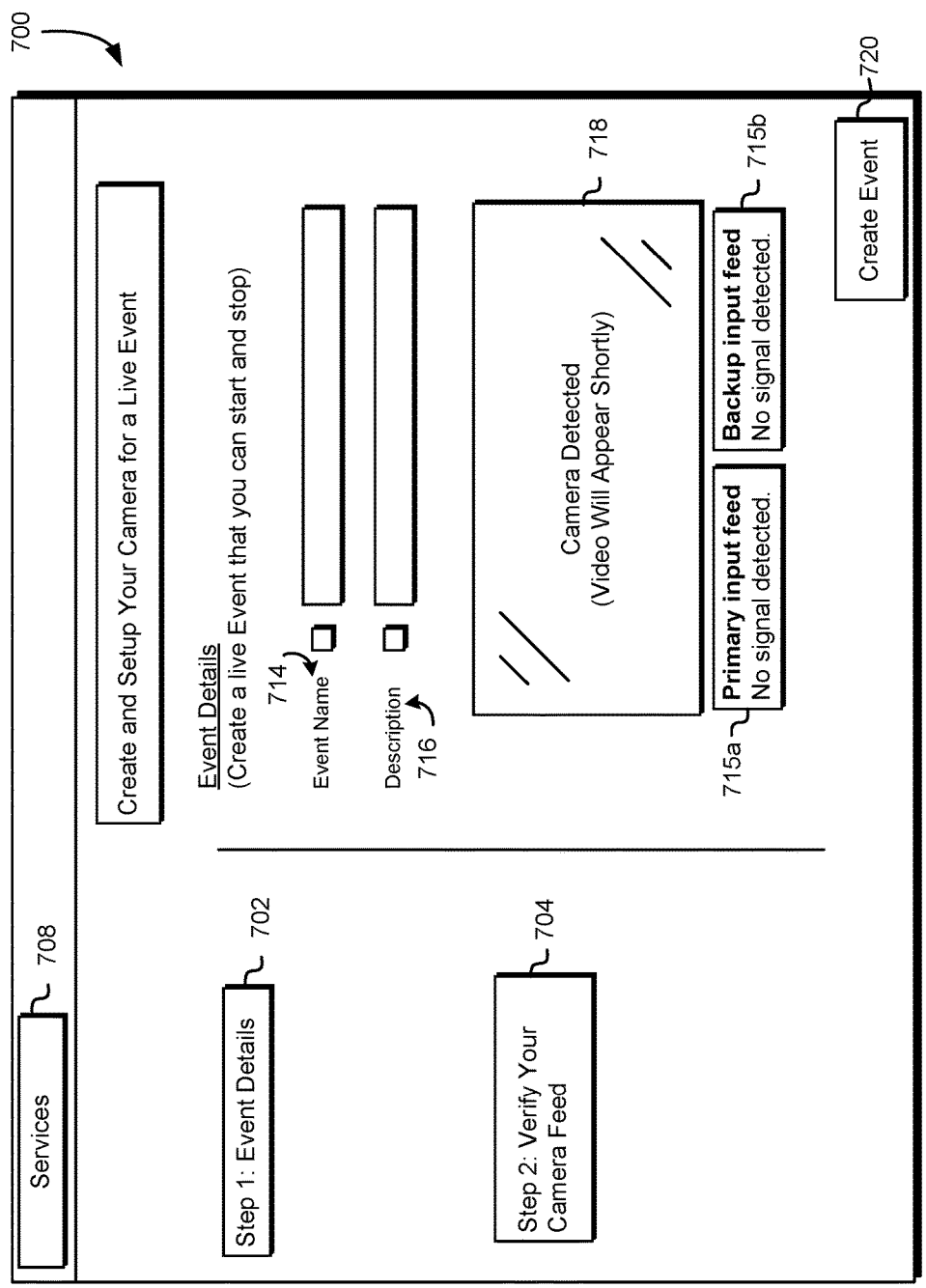
FIG. 7 is an illustrative example of a user interface console for creating a live event in accordance with at least one embodiment.

FIG. 7 is an illustrative example of a user interface console 700 for creating a live event in accordance with at least one embodiment. In general, the user interface console 700 is used by a customer to create the live event, connect the cameras to the computing device and configure the customer's software encoder, and publish the live camera feed to the live multimedia content service via an ingest URI for the specific event. The user interface console 700 further allows the customer to preview and verify their live camera feed prior to making the event public. Once the customer has previewed and verified the feed, the customer is able to make the event public causing the live camera feed from the customer's event to be transmitted to the event's immutable public streaming URI. Viewers may then go to the customer's webpage, request the public streaming URI, and view the live event in a viewer's player.

As illustrated in FIG. 7, the user interface console 700 is a customer-facing console for use in creating and managing a live event to be published by the live multimedia content service 299 as described and depicted in connection with FIG. 2. The user interface console 700 is accessible to a customer via a public API for the live multimedia content service, which requires a front-end virtual Internet protocol (VIP) address 212 in order to expose the customer console 222 and the customer services engine 224 of FIG. 2 to the customer of the live event.

As a first step, the user interface console 700 may enable a customer to create event details 702 for the live event. The customer would enter an event name 714 and a description of the live event 716 in order to begin. As a second step in the illustration of FIG. 7, the user interface console 700 may enable a customer to verify the camera feed 704. The customer may view a preview screen 718 that may inform the customer the status of the video uplink (e.g., is the video streaming, paused, etc.). The user interface console 700 further provides information and detection of the customer's primary input feed 715a and backup input feed 715b, which, once the camera/multimedia recording devices are properly connected, the user interface console 700 will indicate that both feeds are receiving signals. A create event 720 button begins the workflow to create a new live event based on the entered information.

The user interface console 700 further includes access to services 708, which may include instructions or services for installing and/or configuring encoding software on the customer's computing device, caption stream support, private live streaming options, inline insertion of cue tones (e.g., to signal a local advertisement insertion opportunity in the transport stream), advanced API settings, and additional customer services for use with the live streaming event console.

FIG. 8 is an illustrative example of a user interface console 800 for showing live transcoding events in accordance with at least one embodiment. The user interface console 800 provides a view of created live events for the customer; the interface shows the name 816, status 818, and description 820 for five different events. The user interface console 800 displays a list of the customer's live events. The currently running events are listed as (Live), events that are complete but not live (Inactive), then those that are waiting for camera input (Ready), and finally those that have completed (Archived).

For example, the user interface console 800 shows five live events that have been created, such as a first event named "Rabbits," which is described as an event for watching rabbits and it is currently live at time 00:23:02. The other events have names, statuses, and descriptions. The statuses show if the event is live, inactive, ready and receiving camera signals, ready and waiting for camera signals, archived and not listening for a camera signal. The user interface console 800 provides additional actions 806, such as the ability to update, change, and delete statuses, event names, and event descriptions, review or request transcoding services 803, and the ability to perform additional actions that may be useful in creating live event details. In addition, the user interface console 800 enables the user to filter or view all events 812 or search for additional live events 814.

Figure 9:
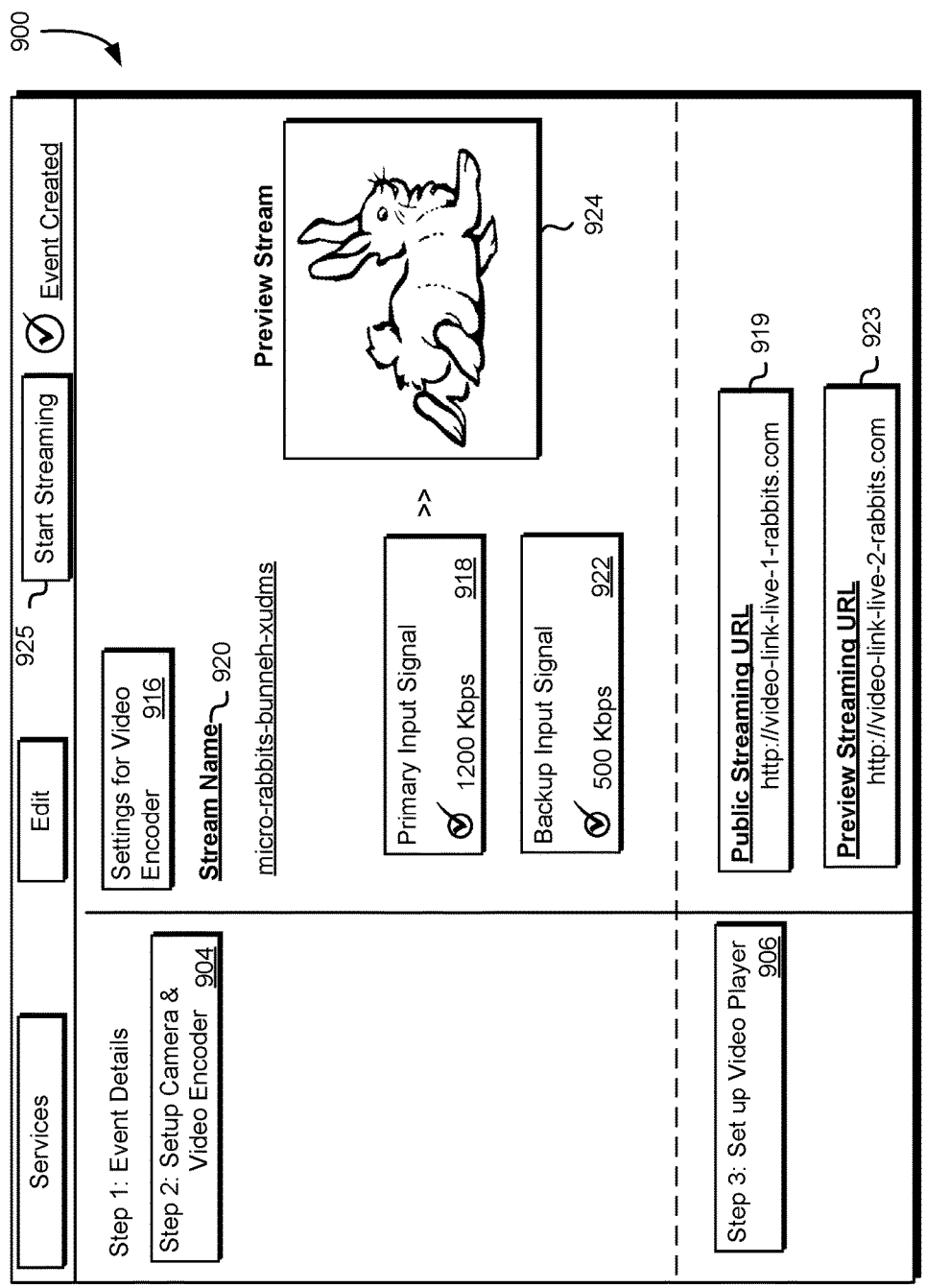
FIG. 9 is an illustrative example of a user interface console for setting a video encoder and a video player for use during a live event in accordance with at least one embodiment.

FIG. 9 is an illustrative example of a user interface console 900 for setting a video encoder and a video player for use during a live event in accordance with at least one embodiment. The user interface console 900 provides instructions and a user-interface for setting-up the cameras for the live event and setting up a video player for the live event.

For example, the customer may begin at Step 2: Setup Camera and Video Encoder 904 option on the user interface console 900 which provides a stream name 920, a stream preview 924, bitrate information for the primary input signal 918, bitrate information for the backup input signal 922, and settings for video encoder 916. Before the live event is streamed, a customer may preview their raw camera feed in the preview stream player 924 to see what the viewer will see once the event is published as live. The customer can further confirm that the primary and backup camera/encoder setups are each connected and transmitting properly.

At Step 3: Set up Video Player 906 option on the user interface console 900 the customer is provided with a public streaming URL 919 and a preview streaming URL 923. Using the preview streaming URL 923, the customer is able to preview and validate their live event stream within the customer's player or the customer may preview and validate the event within the user interface console 900 user interface.

The URLs may be provided from a live multimedia content service, such as the live multimedia content service 299 as described and depicted in connection with FIG. 2, specifically from a customer console 222 and/or customer services engine 224. The service provides an immutable public streaming URI for each output format (e.g., HLS, DASH, etc.). A customer may configure his/her multimedia player using the adaptive-bitrate streaming URL compatible with the particular player software and device type. The player may automatically switch between the different bitrates listed by the streaming URL so the viewer has the best streaming experience given the performance of the viewer's network. Once the customer has previewed and verified the camera feeds from the primary input and the backup input, the event is available and ready to make public. The customer may simply begin streaming the live event using the "start streaming" button 925.

Figure 10:
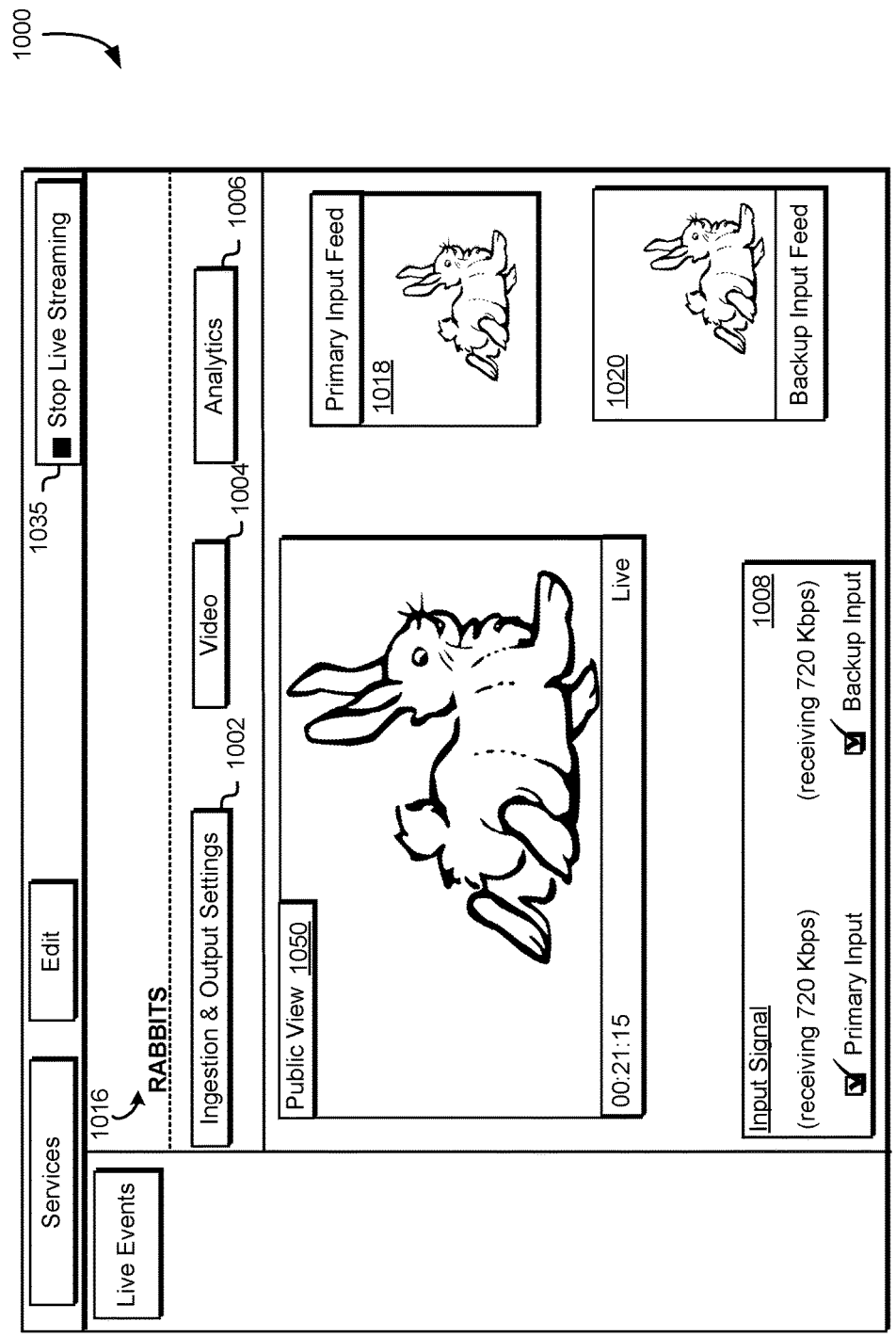
FIG. 10 is an illustrative example of a user interface console showing an active, streaming live event in accordance with at least one embodiment.

FIG. 10 is an illustrative example of a user interface console 1000 showing an active, streaming live event in accordance with at least one embodiment. The user interface console 1000 shows the live streaming event "Rabbits" 1016 in a streaming state, where the event is being recorded by the customer's primary and backup input devices and being streamed to viewer devices via a public streaming URI. The webpage for the active streaming event provides/embeds a player 1050 showing the customer the public view of the live event.

The user interface console 1000 further provides a primary input feed viewer 1018 and a backup input feed viewer 1020, which allows the customer to view the input being received from both camera feeds. The input feed viewers enable a customer to ensure that both recording devices are active and transmitting multimedia content to a streaming service, such as the live multimedia content service 299 as described and depicted in connection with FIG. 2. The user interface console 1000 may further provide the customer with input signal activity 1008 information related to both the primary input stream and the backup input stream.

The user interface console 1000 includes an ingestion and output settings 1002 interface to provide an overall health status of the publishing feed during the live event. For example, the user interface console 1000 may provide information related to any failures that occur, automatic recovery status, and whether viewers are affected. The user interface console 1000 further provides an analytics 1006 section that may include information such as the number of viewers of the live event, the percentage of viewers using mobile devices, the average session duration, and other real-time viewer metrics and analytics. The user interface console 1000 further provides a video section 1004 that may allow the customer to switch from other views (e.g., the ingestion and output settings 1002 view, the analytics section 1006 view, etc.) to return to view the player 1050. To stop the live streaming event, the customer can press the "stop live streaming" button 1035 on the user interface console 1000. This will stop the stream from reaching viewers and disable the input from being streamed to the publishing point, such as the ingest endpoint instances 130 and 140 as described and depicted in connection with FIG. 1.

Figure 11:
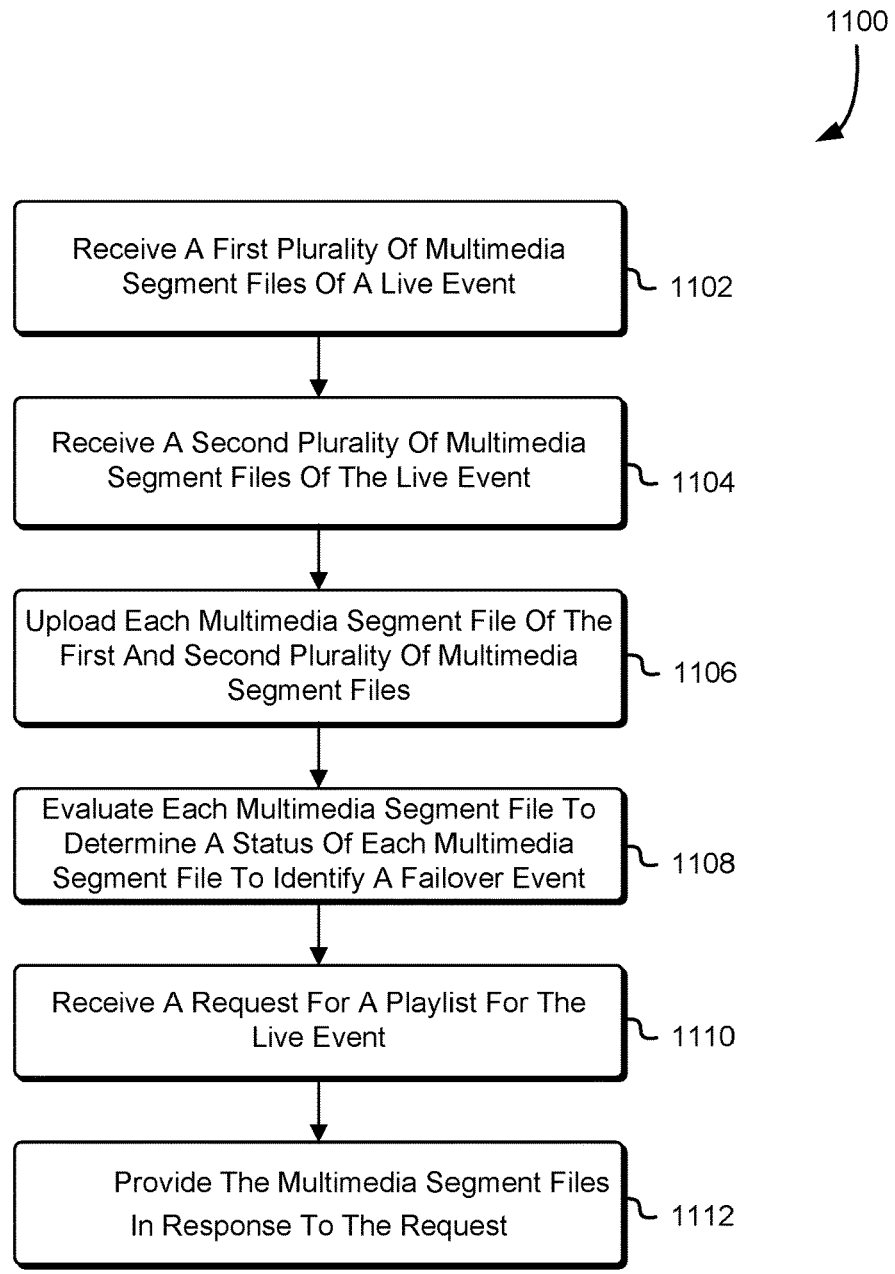
FIG. 11 is an illustrative example of a process for determining a failover event occurrence in accordance with at least one embodiment.

FIG. 11 is an illustrative example of a process that, when performed by a computer system, generates an on-demand playlist with dynamic failover capabilities, in accordance with an embodiment. A process diagram 1100 illustrates a process that can be executed by a virtual computer system service instance, such as the ingest endpoint 130 as described and depicted in connection with FIG. 1. The computer system service instance may receive a first plurality of MMSFs for a live event 1102. The MMSFs may be transmitted to the computer system service instance as multimedia input from a customer's recording devices and transcoded in multimedia segment files during an ingest process by the computer system service instance. The first plurality of MMSFs may be received from a first recording device for a live event. The ingest endpoint further receives a second plurality of MMSFs of the live event 1104. The second plurality of MMSFs may be transmitted from a different recording device that is recording the same live event as the first recording device. The computer system service instance uploads each MMSF of the first and second plurality of MMSFs to a data storage service 1106, such as the on-demand data storage service 105 as described and depicted in connection with FIG. 1.

Returning to FIG. 11, the computer system service instance evaluates each MMSF to determine a status of each MMSF 1108. The determined status provides information related to possible failover events on one of the publishing streams from which the multimedia input was received. A request for the live event may be received from a player application running on a viewer's computing device 1110. The requests for the live event may include an immutable public streaming URI for streaming the live event, where the URI is provided to the player once and is used for the entire live event. Each time the playlist is updated (e.g., new MMSFs are added to the playlist and/or old MMSFs are deleted from the playlist), the player on a viewer's device refreshes the URI and receives/plays the most recently received files. In response to the request, the viewer is provided with portions of the live streaming event as created in the playlist 1112.

Figure 12:
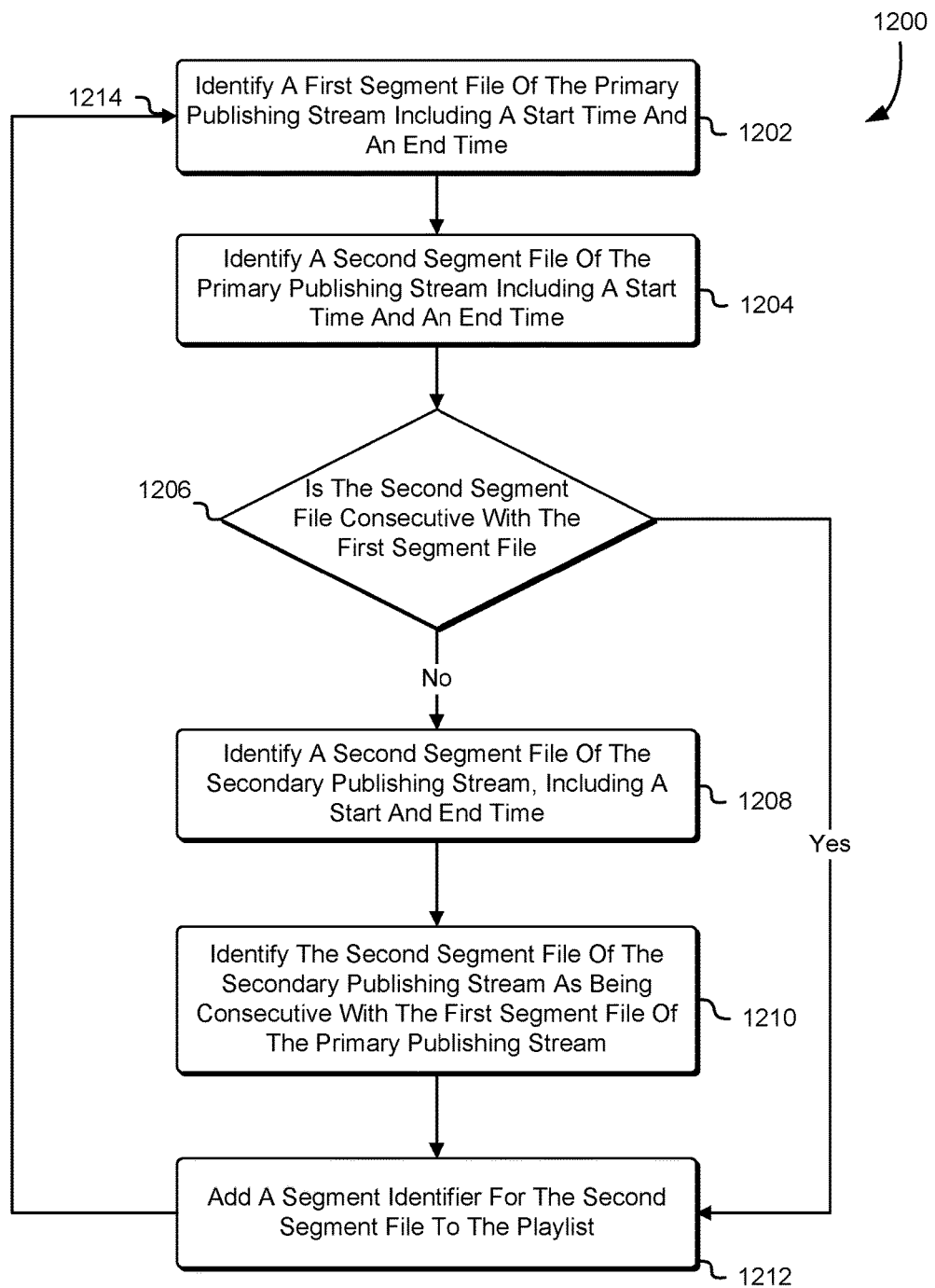
FIG. 12 is an illustrative example of a process for identifying consecutive video segments in accordance with at least one embodiment.

FIG. 12 is an illustrative example of a process 1200 that may be used to determine when a failover event occurs on a first or second primary publishing stream. The process 1200 may be performed by instance delivery service, such as the delivery service 215 as described and depicted in connection with FIG. 2. Returning to the process 1200, the delivery service identifies a first MMSF of a primary publishing stream 1202. The MMSFs may be transmitted to the computer system service instance as multimedia input from a customer's recording devices and transcoded in multimedia segment files during an ingest process by the computer system service instance. The first segment file may include additional metadata related to the MMSF, for example, the metadata may include timestamps for a start and end time of the MMSF. The delivery service further identifies a second MMSF of the primary publishing stream 1204, including determining, from the metadata, a start time and an end time of the second segment.

The delivery service reads a data table to determine if the second MMSF of the primary publishing stream is consecutive with the first segment file 1206. The data table may be used by the delivery service to retrieve information related to the MMSF that is stored to the data table during ingest and transcoding of the MMSFs by an ingest endpoint, such as ingest endpoints 230 and 240 as described and depicted in connection with FIG. 2. If the second segment file is consecutive with the first segment file, the process 1200 continues to block 1212 and a segment identifier is added to the playlist file.

In some example embodiments, consecutive segments may include segments that come directly after a previous segment or within a certain amount of time after the previous segment. For example, if a first MMSF on a first publishing stream has a start timestamp 00:10:05 and an end timestamp 00:10:15, and a second MMSF on a second publishing stream has a start timestamp of anything between 00:10:15 and 00:10:20, the second MMSF on the second publishing stream will be consecutive with the first MMSF on the first publishing stream. In other example embodiments, consecutive may include a timestamp duration identified by the service provider that may be in increments of 0.01 to 1.0 seconds between a current segment and a previous segment in order to consider the two segments as consecutive. In some example embodiments, the delivery service reads timestamps or other metadata related to the stored MMSFs from a table to determine which segment identifiers to add to the playlist. As the delivery service functions, in some example embodiments, according to a broadcast delay, the MMSF currently being recorded/transcoded is not the MMSF being referenced and added to the playlist or transmitted to the player of a viewer device. The broadcast delay allows for writes of the MMSFs to the on-demand data storage service to occur at time of receipt of the segments and no writes are committed during the time of delivery.

Returning to FIG. 12, at block 1208, the delivery service identifies a second segment file of a secondary publishing stream, including a start time and an end time. The second segment file from the secondary publishing stream is identified based on a timestamp or metadata identifying the second segment file from the secondary publishing stream to correspond with the second segment file of the primary publishing stream. In other words, both segments provide the same portion of the live streaming event and may be used interchangeably. In alternative example embodiments, the delivery service may determine a number of slate segments to enter in place of a missing media segment by determining a length of a discontinuity between the start time of a current MMSF with of the consecutive previous segment. The length of the discontinuity may be calculated by determining the system epoch of a current segment, the timestamp of the previous segment, and the segment duration of the previous segment. Length of discontinuity=system epoch of the current segment−(timestamp of the previous segment+segment duration of previous segment). Where an epoch is generally a date and time relative to which clock and timestamp values are determined, such as the clock and timestamp values of a computer system. The epoch traditionally corresponds to 0 hours, 0 minutes, and 0 seconds (00:00:00).

Returning to FIG. 12, the delivery service determines if the second segment file of the secondary publishing stream is consecutive with the first segment file of the primary publishing stream 1210. If the second segment file of the secondary publishing stream is consecutive with the first segment file of the primary publishing stream, the MSN for the second segment file may be added to the playlist. Note that in embodiments, as a result of determining that the second segment file of the secondary publishing stream is consecutive with the first segment file of the primary publishing stream, the system performing the process 1200 will switch the secondary publishing stream to be the primary publishing stream, and likewise the former primary publishing stream will be switched to be a secondary publishing stream. In this manner, the failover event causes the roles of the primary and secondary publishing streams to be reversed. The process 1200 continues to block 1212 and a segment identifier is added to the playlist file.

The delivery service may update or modify the playlist based on additional reads of received information related to new segment files 1214 from the primary publishing stream. As noted, if the roles of the primary and secondary publishing stream were reversed in 1210, the new segment file in 1202 will correspond to a segment file of the formerly secondary, but now primary, publishing stream. The delivery service may further be configured to generate the playlist based at least in part on a timestamp of a request from a viewer. For example, as the live event is streaming, a viewer request for the live event at minute 1:00:00 may be received by the delivery service and the delivery service processes the request by generating a playlist beginning at minute 0:50:00. In other words, the delivery service is generating a playlist for a timestamp that has occurred based on the metadata recorded in a table or database by an ingest endpoint.

Figure 13:
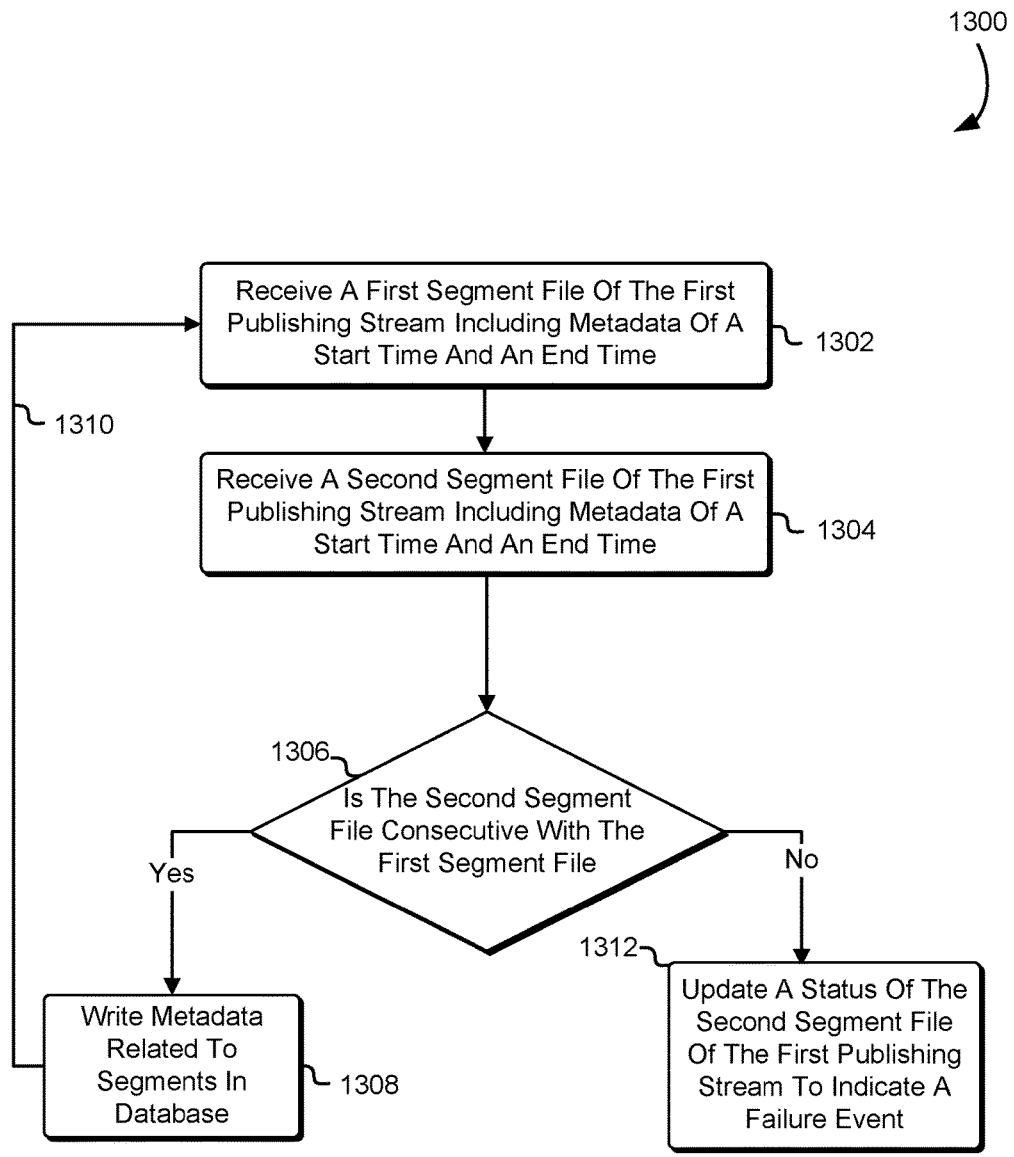
FIG. 13 is an illustrative example of a process for receiving video segments and updating metadata related to the received segments in accordance with at least one embodiment.

FIG. 13 is an illustrative example of a process 1300 that may be used to receive multimedia segment files (MMSFs) and updating a database to include metadata related to the received segments. The process 1300 may be performed by an ingest endpoint, such as the ingest endpoint 230 as described and depicted in connection with FIG. 2. Returning to FIG. 13, the ingest endpoint may receive a first segment file of the first publishing stream, including metadata of a start time and an end time of the first segment 1302. Next, the ingest endpoint may receive a second segment file of the first publishing stream, including metadata of a start time and an end time of the first segment 1304. The ingest endpoint may further compare the first and second segments of the first publishing stream to determine if the segments are consecutive 1306.

If the second segment is consecutive with the first segment file, in other words, if the second segment file follows the first segment file without a gap or interruption, then the ingest endpoint may write to a table in a database, such as database service 225 as described and depicted in connection with FIG. 2. For example, the ingest endpoint may write the metadata 1308 related to the segment files identifying the timestamps as being consecutive. The ingest endpoint may then receive additional segments 1310.

If the second segment is not consecutive with the first segment, the ingest endpoint may update (or create) a status or write information in a table, identifying the two segments as being non-consecutive 1312. For example, if the second segment is missing or corrupt, the ingest endpoint may update the status in the data table to identify that segment as being unusable for use in streaming the live event. The ingest endpoint may update the table to include status information related to the MMSF identifying the segment as being available for use in streaming the live event.

Figure 14:
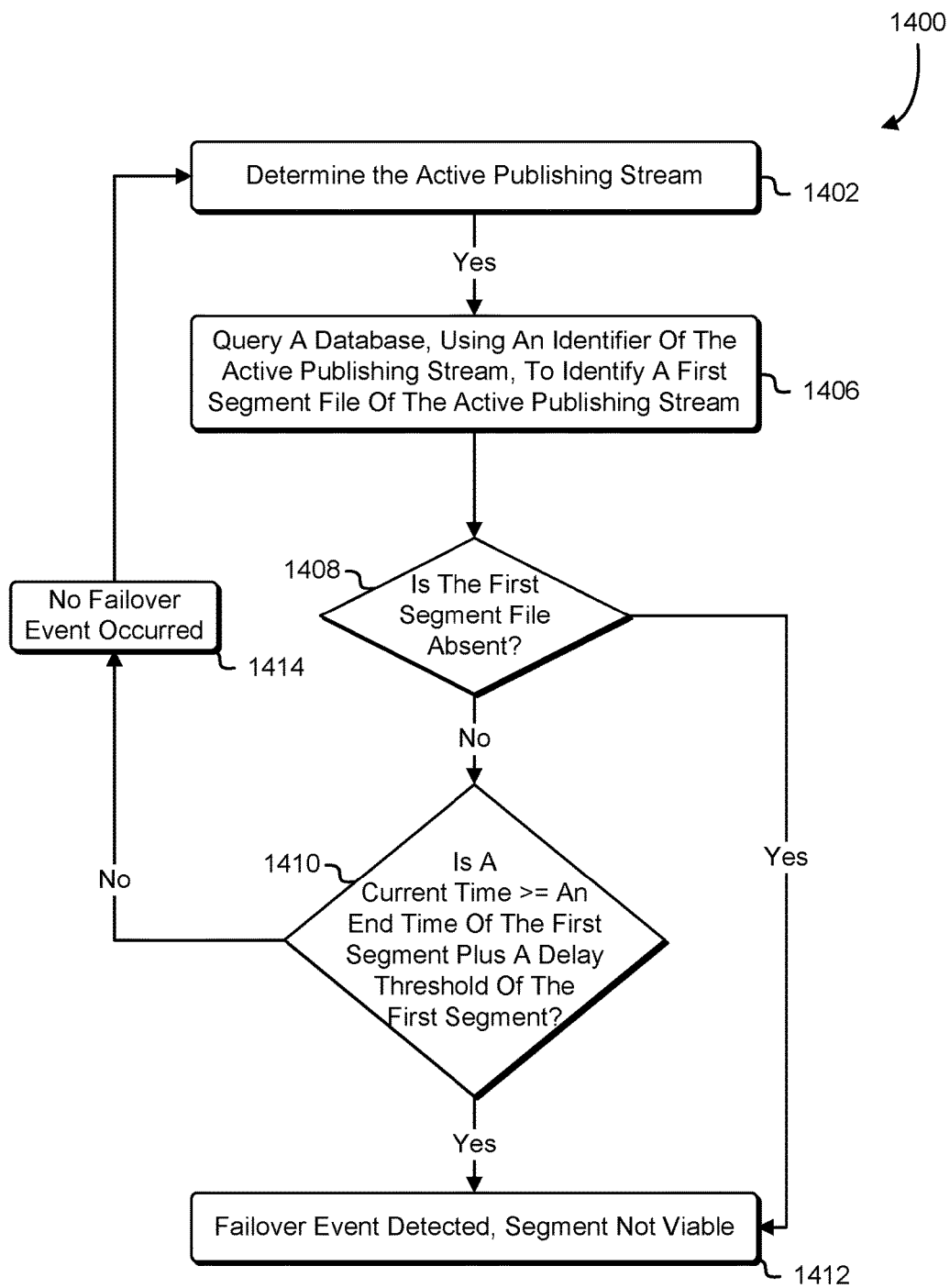
FIG. 14 is an illustrative example of a process for determining an active publishing stream in accordance with at least one embodiment.

FIG. 14 is an illustrative example of a process 1400 that may be used to determine an active publishing stream. The example of the process 1400 depicts a more detailed example of operations that may be performed in 1206-10 of FIG. 12. The process 1400 may be performed during ingest, such as by the ingest fleet 535 as described and depicted in connection with FIG. 5. Returning to FIG. 14, in 1402 the system performing the process 1400 determines if a primary publishing stream is the active publishing stream. The primary publishing stream may be determined to be active based on metadata stored in a table of a database service that indicates the status of MMSFs as being usable or unusable as a next available portion of the live streaming event. If the primary publishing stream is not the active publishing stream, the system performing the process 1400 determines if the secondary publishing stream is the active publishing stream. If the secondary publishing stream is not active, then the system may return to determine if the primary publishing stream has become active at a later time.

If the primary publishing stream or the secondary publishing stream is active, the system performing the process 1400 may query a table or database to identify a first segment file of the active publishing stream 1406. The system determines if the first segment file of the active publishing stream is valid 1408, where the segment may be unavailable if it is absent, corrupt, non-consecutive, or other reasons related to the availability of a MMSF. If the first segment file is determined to be absent or otherwise unavailable, the file is considered to cause a failover event. The system, once the failover event is determined, updates a table or a database service to indicate a failover event on the active stream 1412.

Returning to block 1408, if the first segment file of the active publishing stream is available (e.g., not absent), the system performing the process 1400 determines if the current time is greater than or equal to an end time of the first segment plus a delay threshold of the first segment 1410. If the answer to block 1410 is yes, a failover event is determined and the system does not use that segment in building a playlist 1412. Returning to block 1410, if the answer to block 1410 is no, the system determines that no failover condition has occurred.

In at least one embodiment, the system performing the process 1400 is configured to generate a playlist with zero database write operations. In other words, when media segments are being received by the system (e.g., during ingest), there may be an amount of buffer time (e.g., 10 seconds, 20 seconds, etc.) between when the video is received and when it is available to be viewed by a customer during a time while the media segments are written to the on-demand data storage service "ahead" of potential requests for the media. During this time, the system also makes any decisions for failover (e.g., process 1400). However, in order to provide fast and scalable playlist generation on demand (e.g., in response to multiple coinciding requests for the playlists to view the media), playlists generated in response to the requests are generated to reference the media segments that have been written ahead, without the necessity of performing write operations to persistent storage. In this manner, the delivery service, such as via the delivery endpoint 510 of FIG. 5, may respond to large numbers of requests (e.g., tens of thousands) in parallel and much more quickly because writes were performed during ingest time, and the delivery service need only perform read operations to consistently deliver the same media content to all viewers.

Figure 15:
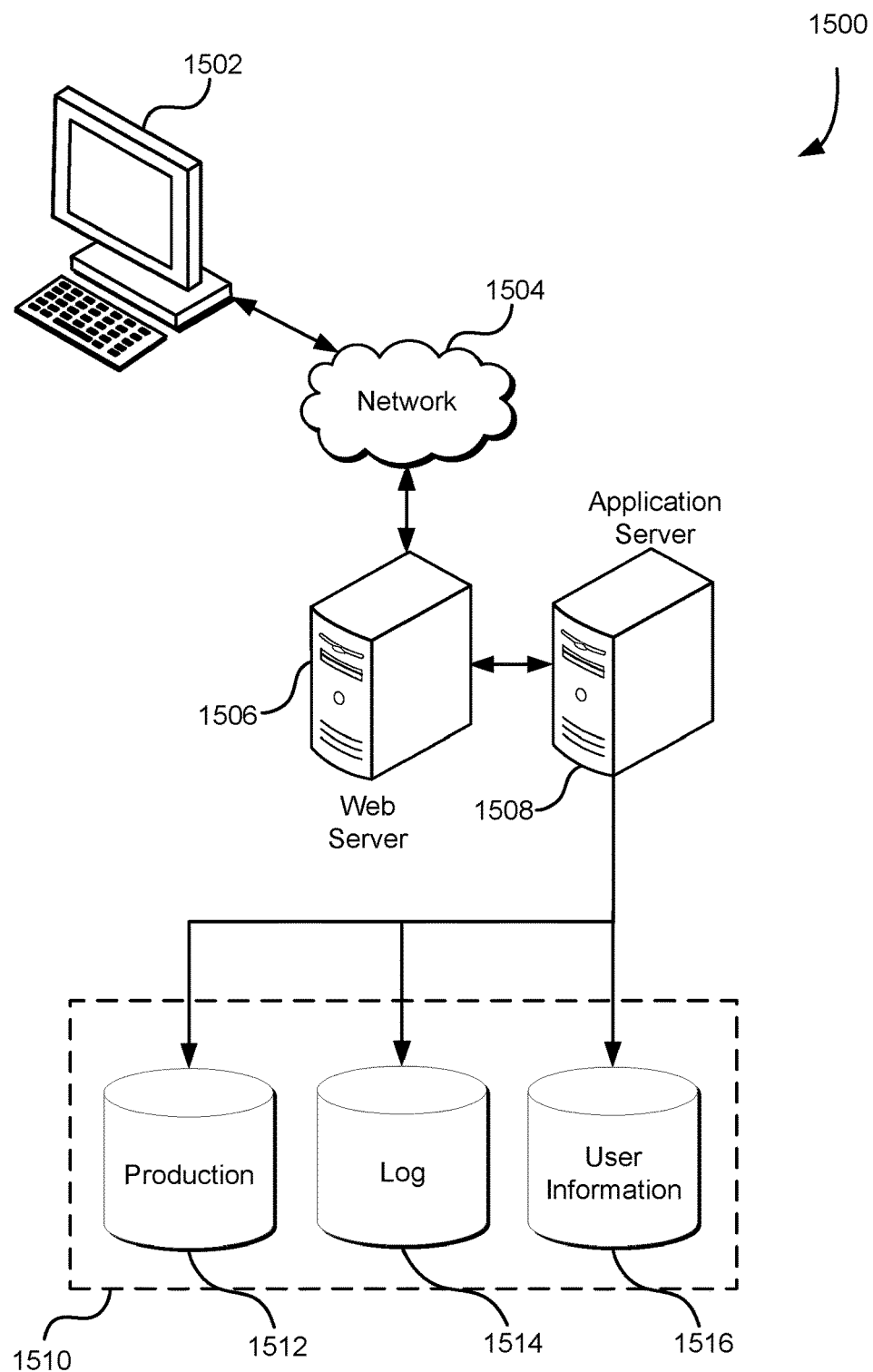
FIG. 15 illustrates an environment in which various embodiments can be implemented.

FIG. 15 illustrates aspects of an example environment 1500 for implementing aspects in accordance with various embodiments. As will be appreciated, although a web-based environment is used for purposes of explanation, different environments may be used, as appropriate, to implement various embodiments. The environment includes an electronic client device 1502, which can include any appropriate device operable to send and/or receive requests, messages, or information over an appropriate network 1504 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1502 and the application server 1508, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1510 can include several separate data tables, databases, data documents, dynamic data storage schemes and/or other data storage mechanisms and media for storing data relating to a particular aspect of the present disclosure. For example, the data store illustrated may include mechanisms for storing production data 1512 and user information 1516, which can be used to serve content for the production side. The data store also is shown to include a mechanism for storing log data 1514, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. The application server 1508 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1502. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   one or more processors; and
   memory including instructions that, as a result of execution by the one or more processors, cause the system to:
   receive a first video stream of an event, the first video stream produced by a first video recorder;
   receive a second video stream of the event, the second video stream produced by a second video recorder different than the first video recorder, the first video stream and the second video stream stored in segments;
   determine a first playlist that includes storage locations of segments of the first video stream, the first playlist comprising a first sequence of references associated with a particular Uniform Resource Identifier usable at least in part by a media player to request the segments of the first video stream; and
   based at least in part on a determination that receipt of the first video stream has ceased for a threshold amount of time:
   determine a first segment of the first video stream, a second segment of the second video stream, and a gap in time between an end time of the first segment and a start time of the second segment, the first segment determined at least in part from an end time of a most-recent segment of the first video stream delivered to the media player at or before a fail-over time for the first video stream, the second segment of the second video stream determined at least in part from a start time of the second segment occurring at or after the fail-over time;
   create a second playlist, the second playlist comprising a second sequence of references that includes storage locations of segments of the second video stream that begins with a default segment inserted to fill the gap in time between a first reference corresponding to the first segment of the first video stream and a second reference corresponding to the second segment of the second video stream, the second sequence of references including a reference to the default segment that precedes the second reference, the default segment having a duration determined based at least in part on a time gap between the segment of the first video stream and the segment of the second video stream; and
   allow the media player to request segments of the second video stream at least in part by using the particular Uniform Resource Identifier.

2. The system of claim 1, wherein the second playlist includes storage locations of segments of the first video stream that have end times earlier than the start time of the second segment.

3. The system of claim 1, wherein:
   the event is being recorded at least in part under direction of a customer of the computing resource service provider that hosts the system; and
   the default segment either:
   results in a black screen being displayed on the media player for a duration of the gap in time, or
   is an image provided by the customer for display on the media player for the duration of the gap in time.

4. The system of claim 1, wherein:
   the segments of the second video stream have been written to their respective storage locations ahead of a request for the segments by the media player; and
   the second playlist is created to include the storage locations of the segments of the second video stream without performing a write operation to persistent storage.

5. A computer-implemented method, comprising:
   generating a first playlist comprising a first sequence of references to respective segments of a first media stream corresponding to the first sequence of references, the first playlist having an identifier for obtaining a copy of the first playlist;
   determining a second segment of a second media stream with a start time that is later than an end time of a first segment of the first media stream;
   detecting that the first media stream has ceased for a threshold amount of time;
   generating a second playlist comprising a second sequence of references to respective segments of the second media stream corresponding to the second sequence of references that begin with the second segment, wherein the second sequence of references include a reference to a default segment that precedes the second references of the second media stream, the default segment having a duration determined based at least in part on a time gap between the segment of the first media stream and the segment of the second media stream;
   receiving a request for a playlist that includes the identifier; and
   providing a copy of the second playlist.

6. The computer-implemented method of claim 5, wherein the first and second references are references to storage locations.

7. The computer-implemented method of claim 5, wherein the identifier is a Uniform Resource Identifier.

8. The computer-implemented method of claim 5, wherein the second playlist further comprises references to at least one segment of the first media stream that have end times earlier than the start time of the second segment.

9. The computer-implemented method of claim 5, further comprising inserting a reference to a default segment between the end time of the first segment and the start time of the second segment.

10. The computer-implemented method of claim 5, wherein the first media stream and the second media stream are recordings of a same event.

11. The computer-implemented method of claim 5, wherein:
- the first segment of the first media stream is a most-recent segment delivered to a media player; and
- the end time of the first segment corresponds to a time at or before a fail-over time for the first media stream.

12. A non-transitory computer-readable storage medium having stored thereon executable instructions that, as a result of being executed by one or more processors of a computer system, cause the computer system to:
- detect that a first media stream has ceased being received for a threshold amount of time, the first media stream corresponding to a first playlist comprising a first sequence of references, the first sequence of references corresponding to respective segments of the first media stream, the first playlist associated with an identifier usable at least in part to obtain a copy of the first playlist;
- determine a second playlist associated with the identifier that comprises a second sequence of references, wherein the second sequence of references:
  - switches from a first reference corresponding to a segment of the first media stream to a second reference corresponding to a segment of a second media stream; and
  - includes a reference to a default segment that precedes the second reference of the second media stream, the default segment having a duration determined based at least in part on a time gap between the segment of the first media stream and the segment of the second media stream; and
- allow a copy of the second playlist to be obtained at least in part by using the identifier.

13. The non-transitory computer-readable storage medium of claim 12, wherein the first and second media streams are video streams.

14. The non-transitory computer-readable storage medium of claim 12, wherein:
- references of the second playlist are associated with sequence numbers, with each reference of the second playlist having a sequence number that is different from sequence numbers of other references of the second playlist; and
- a media player is able to access segments of the second media stream at least in part via the sequence numbers.

15. The non-transitory computer-readable storage medium of claim 12, wherein:
- the first playlist is located at a storage location in memory of the computer system;
- the second playlist is an update to the first playlist located at the storage location in the memory of the computer system; and
- the executable instructions include executable instructions that, in response to receiving a request from a media player device that includes the identifier, cause the computer system to:
  - obtain the copy of the second playlist from the storage location; and
  - provide the copy of the second playlist to the media player device.

16. The non-transitory computer-readable storage medium of claim 12, wherein:
- the identifier is associated with a single playlist;
- the first playlist is the single playlist at a first time wherein a most-recent reference of the single playlist is a reference to a respective segment of the first media stream; and
- the second playlist is the single playlist at a second time, wherein the most-recent reference of the single playlist is a reference to a respective segment of the second media stream.

17. The non-transitory computer-readable storage medium of claim 12, wherein:
- the first media stream is a recording made of an event by a first recording device; and
- the second media stream is a recording made of the event by a second recording device.

18. The non-transitory computer-readable storage medium of claim 17, wherein the first and second media streams are playable by a media player of a user device.

19. The computer-implemented method of claim 5, wherein the end time of the first segment of the first media stream and the start time of the second segment of the second media stream are identified by an ingest manager.

20. The non-transitory computer-readable storage medium of claim 12, wherein the identifier is a Uniform Resource Identifier.

21. The system of claim 1, wherein the first video stream and the second video stream are recordings of a same event.

* * * * *